(12) United States Patent
Zhuk et al.

(10) Patent No.: US 11,811,544 B2
(45) Date of Patent: Nov. 7, 2023

(54) SYSTEMS AND METHODS FOR STRUCTURING INFORMATION IN A COLLABORATION ENVIRONMENT

(71) Applicant: RingCentral, Inc., Belmont, CA (US)

(72) Inventors: Vadim Zhuk, Foster City, CA (US); Helen Prask, Foster City, CA (US); Ivan Anisimov, Saint Petersburg (RU); William Zhuk, Foster City, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 18/166,608

(22) Filed: Feb. 9, 2023

(65) Prior Publication Data

US 2023/0188374 A1 Jun. 15, 2023

Related U.S. Application Data

(63) Continuation of application No. 17/443,678, filed on Jul. 27, 2021, now Pat. No. 11,601,294, which is a continuation of application No. 16/813,122, filed on Mar. 9, 2020, now Pat. No. 11,108,580.

(60) Provisional application No. 62/816,179, filed on Mar. 10, 2019.

(51) Int. Cl.
*H04L 12/18* (2006.01)
*G06N 20/00* (2019.01)

(52) U.S. Cl.
CPC ........ *H04L 12/1822* (2013.01); *G06N 20/00* (2019.01); *H04L 12/1818* (2013.01)

(58) Field of Classification Search
None
See application file for complete search history.

(56) References Cited

U.S. PATENT DOCUMENTS

| | | | |
|---|---|---|---|
| 10,063,600 B1* | 8/2018 | Marsh | H04N 21/854 |
| 2017/0032325 A1 | 2/2017 | Venkataraman et al. | |
| 2019/0095844 A1 | 3/2019 | Dunne et al. | |
| 2019/0235916 A1 | 8/2019 | Min et al. | |
| 2020/0195686 A1* | 6/2020 | Johns | G06F 16/221 |
| 2020/0341976 A1* | 10/2020 | Aggarwal | G06Q 10/10 |

* cited by examiner

*Primary Examiner* — Angela Nguyen
(74) *Attorney, Agent, or Firm* — Finnegan, Henderson, Farabow, Garrett & Dunner LLP

(57) ABSTRACT

A computer-implemented machine learning method for improving a collaboration environment is provided. The method comprises receiving text data for one or more users of the collaboration environment. The method further comprises generating a statement by partitioning the text data. The method further comprises determining an act using the statement and generating a thread using at least the statement and the act. The method further comprises generating an actor list using at least the thread, and generating an actionable item using the actor list and the thread.

20 Claims, 16 Drawing Sheets

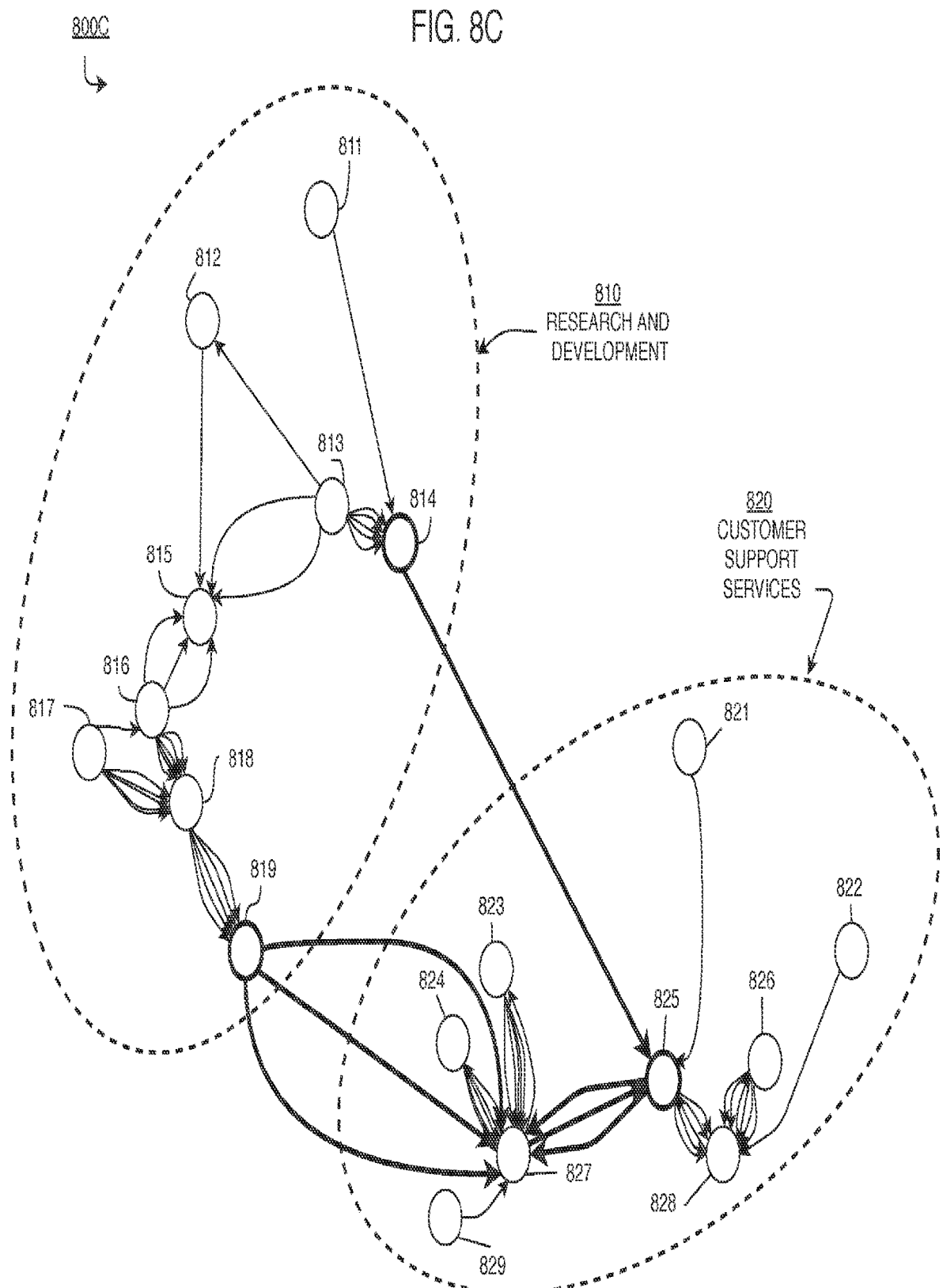

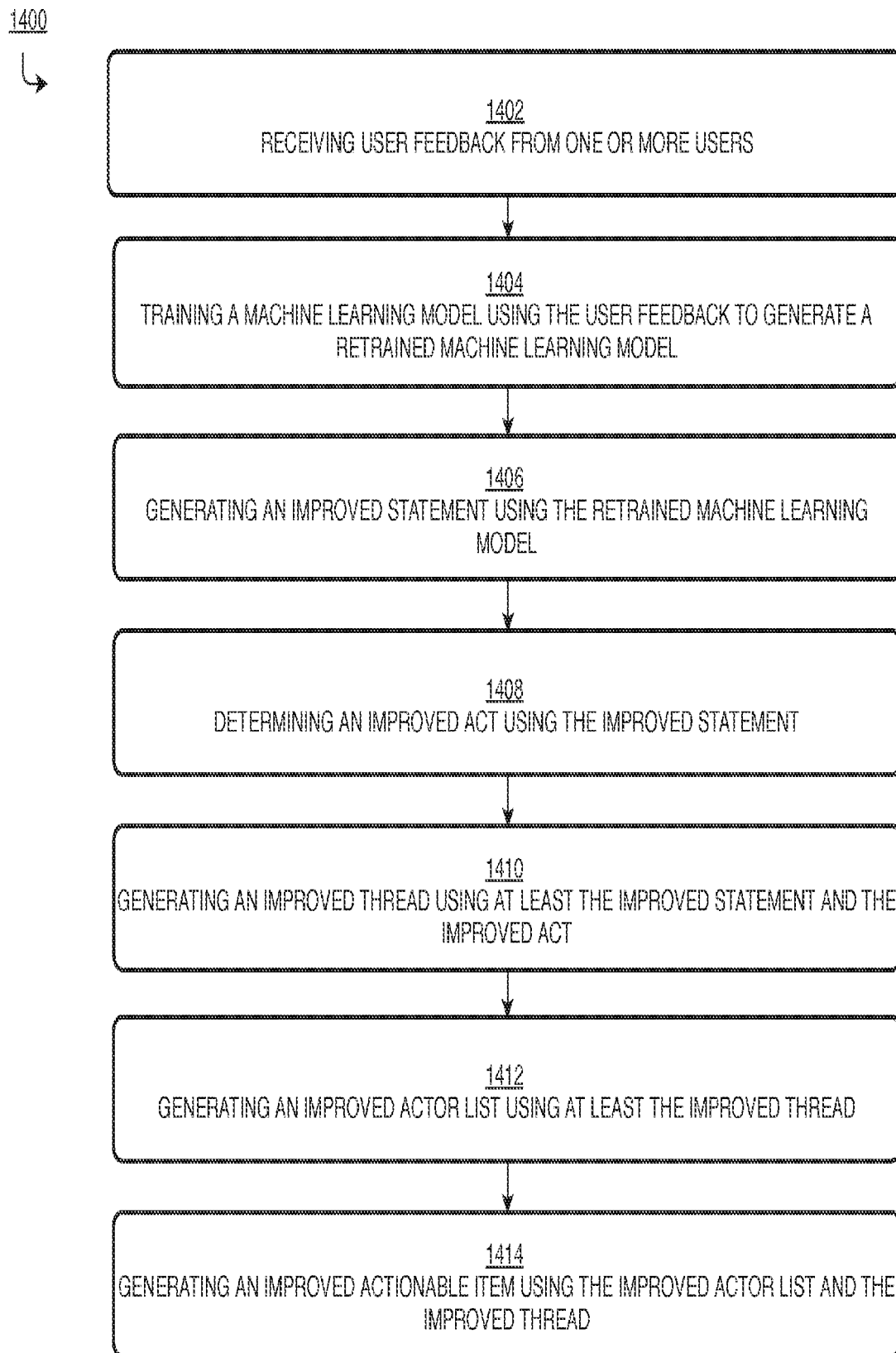

SYSTEMS AND METHODS FOR STRUCTURING INFORMATION IN A COLLABORATION ENVIRONMENT

PRIORITY/BENEFIT CLAIM

This application is a continuation of U.S. application Ser. No. 17/443,678, filed Jul. 27, 2021, which is a continuation of U.S. application Ser. No. 16/813,122, filed Mar. 9, 2020 (now U.S. Pat. No. 11,108,580), which claims the benefit under 35 U.S.C. 119 to provisional application No. 62/816,179, filed Mar. 10, 2019. Each of the above-referenced applications are hereby incorporated by reference in its entirety.

TECHNICAL FIELD

The present disclosure relates generally to the field of collaboration environments. Specifically, the present disclosure relates to systems and methods for evaluating unstructured information within collaboration environments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In an increasingly interconnected society, the number of digital communications have increased dramatically in recent years. The sheer volume of unstructured communications that users of a unified communications and collaboration platform receive on a daily basis is often overwhelming for the users to manage. Moreover, many users communicate using multiple disparate channels of communication, such as telephony, video conferencing, e-mail, Short Message Service (SMS) and Multimedia Messaging Service (MMS) messaging, chat messages, and so forth. Due to the influx of unstructured information through these various channels of communication, users are easily overwhelmed by excessive information.

Therefore, there is a need for an improved collaboration system that automatically structures unstructured communications information.

SUMMARY

The appended claims may serve as a summary of the invention.

BRIEF DESCRIPTION OF THE DRAWINGS

FIG. 8A, FIG. 8B, and FIG. 8C are relational node diagrams depicting global graphs, in example embodiments.

FIG. 14 is a flowchart depicting a feedback process, in an example embodiment.

DETAILED DESCRIPTION

Figure 1:
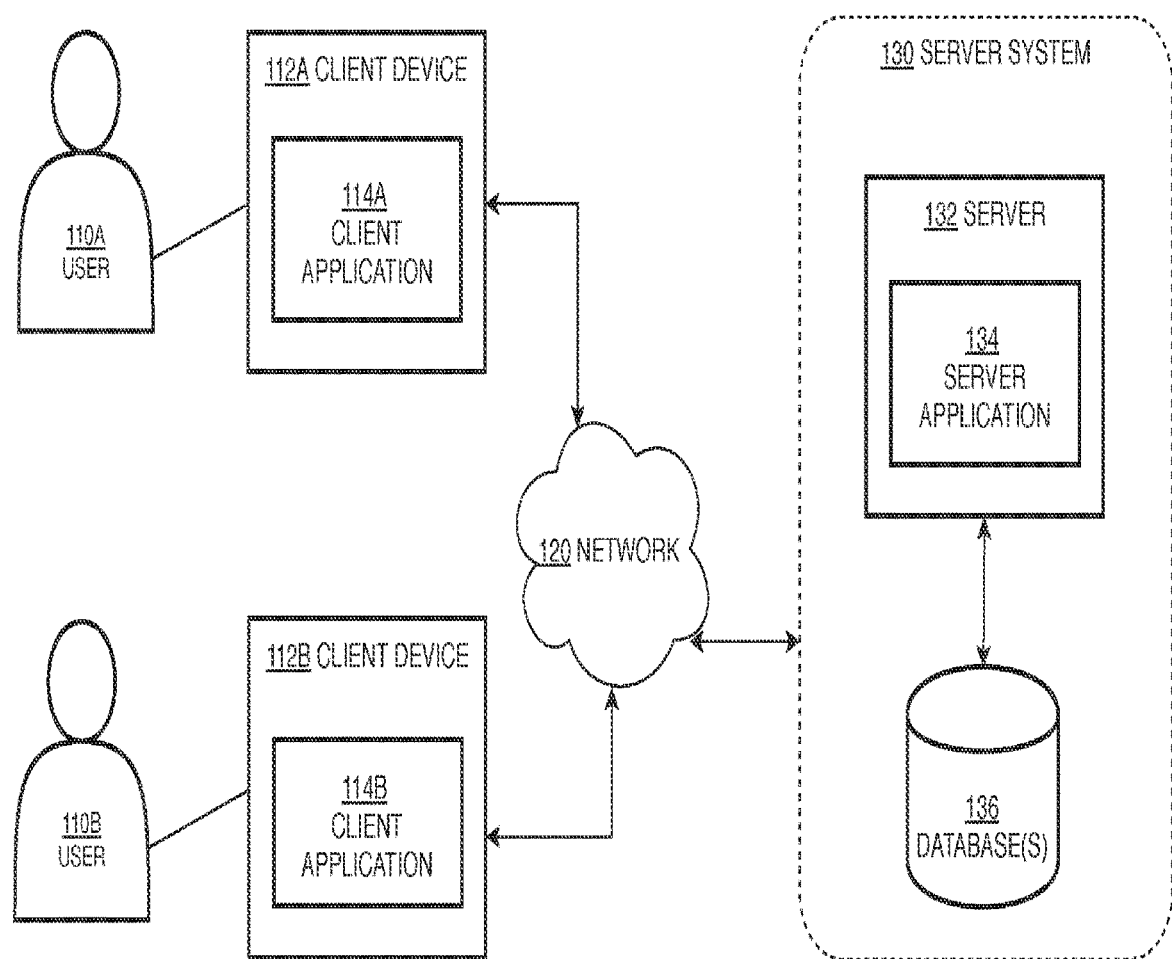
FIG. 1 is a network diagram depicting a networked collaboration system, in an example embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C, SCALA, PYTHON, RUST, or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
1.0 GENERAL OVERVIEW
2.0 STRUCTURAL OVERVIEW
3.0 FUNCTIONAL OVERVIEW
   3.1 Statements Module
   3.2 Communication Threads Module
   3.3 Actors Module
      3.3.1 Actor Representation
   3.4 Action Items Module
   3.5 Display Module
   3.6 Feedback Module
4.0 PROCEDURAL OVERVIEW
5.0 EXAMPLE EMBODIMENTS
   5.1 Intelligent Prioritization of Communication Messaging and Smart Alert
   5.2 Topic Briefing and Discovery
   5.3 Business Unit Work Analytics Dashboard
   5.4 Employee Review with Social Score
   5.5 Company Policy Compliance Monitoring and Auditing
   5.6 Optimization of Cross-Department Communications

1.0 GENERAL OVERVIEW

Traditionally, a user receives digital communication information and acts upon the content of the information. This approach is singular and siloed; users act upon the content of the communications with no knowledge or understanding of broader communication patterns within a team, a physical building, and/or an organization spanning multiple continents. Consequently, communication bottlenecks form at choke points, resulting in communication failures that often go unnoticed due to the lack of understanding of the broader context in which these communications happen. The result of these communication failures is the use of additional computer Central Processing Unit (CPU) resources, network bandwidth and other technological resources to facilitate further, often unsuccessful, communications, which in turn, furthers the inefficient use of even more computing resources.

Moreover, as the number of digital communications increase, tracking not only the overall context but the content itself becomes harder. Individual action items become lost amidst numerous other actions items. Users are forced to remind other users of forgotten action items, overlooked tasks, or follow up months later. The result is, similarly, excessive and wasteful use of CPU processing resources and network bandwidth as users add more communication on top of existing communications.

The presently described approaches seek to address these shortcomings by using machine learning (ML) to evaluate the content of the information, create an overall communication context, and determined target action items that are user-specific. The current disclosure provides an artificial intelligence (AI)-based technological solution to the technological problem of unstructured communications information. Specifically, the technological solution involves using a series of ML algorithms or models to accurately analyze unstructured text-based information, generate structured information, and facilitate appropriate responses based on the structured information. Consequently, these solutions provide the technological benefit of decreasing excessive and wasteful use of technological resources. The current solutions also provide for generating structured information that users otherwise would not have had.

A computer-implemented machine learning method for improving a collaboration environment is provided. The method comprises receiving text data for one or more users of the collaboration environment. In an embodiment, the method further comprises generating a statement by partitioning the text data. The method further comprises determining an act using the statement and generating a thread using at least the statement and the act. In an embodiment, the method further comprises generating an actor list using at least the thread, and generating an actionable item using the actor list and the thread.

A machine learning system for improving a collaboration environment, is also provided. The system comprises a processor and a memory operatively connected to the processor. The memory stores instructions that, when executed by the processor, cause: receiving text data for one or more users of the collaboration environment; generating a statement by partitioning the text data; determining an act using the statement; generating a thread using at least the statement and the act; generating an actor list using at least the thread; and generating an actionable item using the actor list and the thread.

A non-transitory, computer-readable medium storing a set of instructions is also provided. In an example embodiment, when the instructions are executed by a processor the instructions cause: receiving text data for one or more users of the collaboration environment; generating a statement by partitioning the text data; determining an act using the statement; generating a thread using at least the statement and the act; generating an actor list using at least the thread; and generating an actionable item using the actor list and the thread.

2.0 STRUCTURAL OVERVIEW

FIG. 1 shows an example collaboration system 100 in which various implementations as described herein may be practiced. The collaboration system 100 enables a plurality of users to collaborate and communicate through various means, including email, instant message, SMS and MMS message, video, audio, transcriptions, or any other means of communication. In some examples, one or more components of the collaboration system 100, such as client device(s) 112A, 112B and server 132, can be used to implement computer programs, applications, methods, processes, or other software to perform the described techniques and to realize the structures described herein. In an embodiment, the collaboration system 100 comprises components that are implemented at least partially by hardware at one or more computing devices, such as one or more hardware processors executing program instructions stored in one or more memories for performing the functions that are described herein.

As shown in FIG. 1, the collaboration system 100 includes one or more client device(s) 112A, 112B that are accessible by users 110A, 110B, a network 120, a server system 130, a server 132, and a database 136. The client devices 112A, 112B are configured to execute one or more client application(s) 114A, 114B, that are configured to enable communication between the client devices 112A, 112B and the server 132. In some embodiments, the client applications 114A, 114B are web-based applications that enable connectivity through a browser, such as through Web Real-Time Communications (WebRTC). The server 132 is configured to execute a server application 134, such as a server back-end that facilitates communication and collaboration between the server 132 and the client devices 112A, 121B. The components and arrangements shown in FIG. 1 are not intended to limit the disclosed embodiments, as the system components used to implement the disclosed processes and features can vary.

As shown in FIG. 1, users 110A, 110B may communicate with the server 132 and each other using various types of client devices 112A, 112B via network 120. As an example, client devices 112A, 112B may include a display such as a television, tablet, computer monitor, video conferencing console, or laptop computer screen. Client devices 112A, 112B may also include video/audio input devices such as a video camera, web camera, or the like. As another example, client device 112A, 112B may include mobile devices such as a tablet or a smartphone having display and video/audio capture capabilities. Client devices 112A, 112B may also include one or more software-based client applications that facilitate the user devices to engage in communications, such as instant messaging, text messages, email, Voice over Internet Protocol (VoIP), video conferences, and so forth with one another.

The network 120 facilitates the exchanges of communication and collaboration data between client device(s) 112A, 112B and the server 132. The network 120 may be any type of networks that provides communications, exchanges information, and/or facilitates the exchange of information between the server 132 and client device(s) 112A, 112B. For example, network 120 broadly represents a one or more local area networks (LANs), wide area networks (WANs), metropolitan area networks (MANs), global interconnected internetworks, such as the public internet, public switched telephone networks ("PSTN"), or other suitable connection (s) or combination thereof that enables collaboration system 100 to send and receive information between the components of the collaboration system 100. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats, and may further support a variety of services and applications for client device(s) 112A, 112B.

The server system 130 can be a computer-based system including computer system components, desktop computers, workstations, tablets, hand-held computing devices, memory devices, and/or internal network(s) connecting the components. The server 132 is configured to provide collaboration services, such as telephony, video conferencing, messaging, email, project management, or any other types of communication between users. The server 132 is also configured to receive information from client device(s) 112A, 112B over the network 120, process the unstructured information to generate structured information, stored the information in a database 136, and/or transmit the information to the client devices 112A, 112B over the network 120. For example, the server 132 may be configured to receive physical inputs, video signals, audio signals, text data, user data, and security data, analyze the received unstructured information, and generate structured graphs and action items, store the generated graphs and action items, and/or send the graphs and action items to the client devices 112A, 112B.

In some implementations, the functionality of the server 132 described in the present disclosure is distributed among one or more of the client devices 112A, 112B. For example, one or more of the client devices 112A, 112B may perform functions such as processing unstructured data to generate structured information, in some embodiments. The structured information may be sent to the server 132 for further processing and/or storage in database(s) 136.

Database(s) 136 include one or more physical or virtual, structured or unstructured storages coupled with the server 132. The database 136 is configured to store a variety of data. For example, the database 136 stores communications data, such as audio, video, text, or any other form of communication data. The database 136 is also stores security data, such as access lists, permissions, and so forth. The database 136 also stores internal user data, such as names, positions, organizational charts, and so forth, as well as external user data, such as data from as Customer Relation Management (CRM) software, Enterprise Resource Planning (ERP) software, project management software, source code management software, or any other external or third party sources. In some embodiments, the database 136 is also configured to store fully structured graphs, action items, to-do lists, or any other structured information created from unstructured data. In some embodiments, the database 136 is stored in a cloud-based server (not shown) that is accessible by the server 132 and/or the client devices 112A, 112B through the network 120. While the database 136 is illustrated as an external device connected to the server 132, the database 136 may also reside within the server 132 as an internal component of the server 132.

3.0 FUNCTIONAL OVERVIEW

Figure 2:
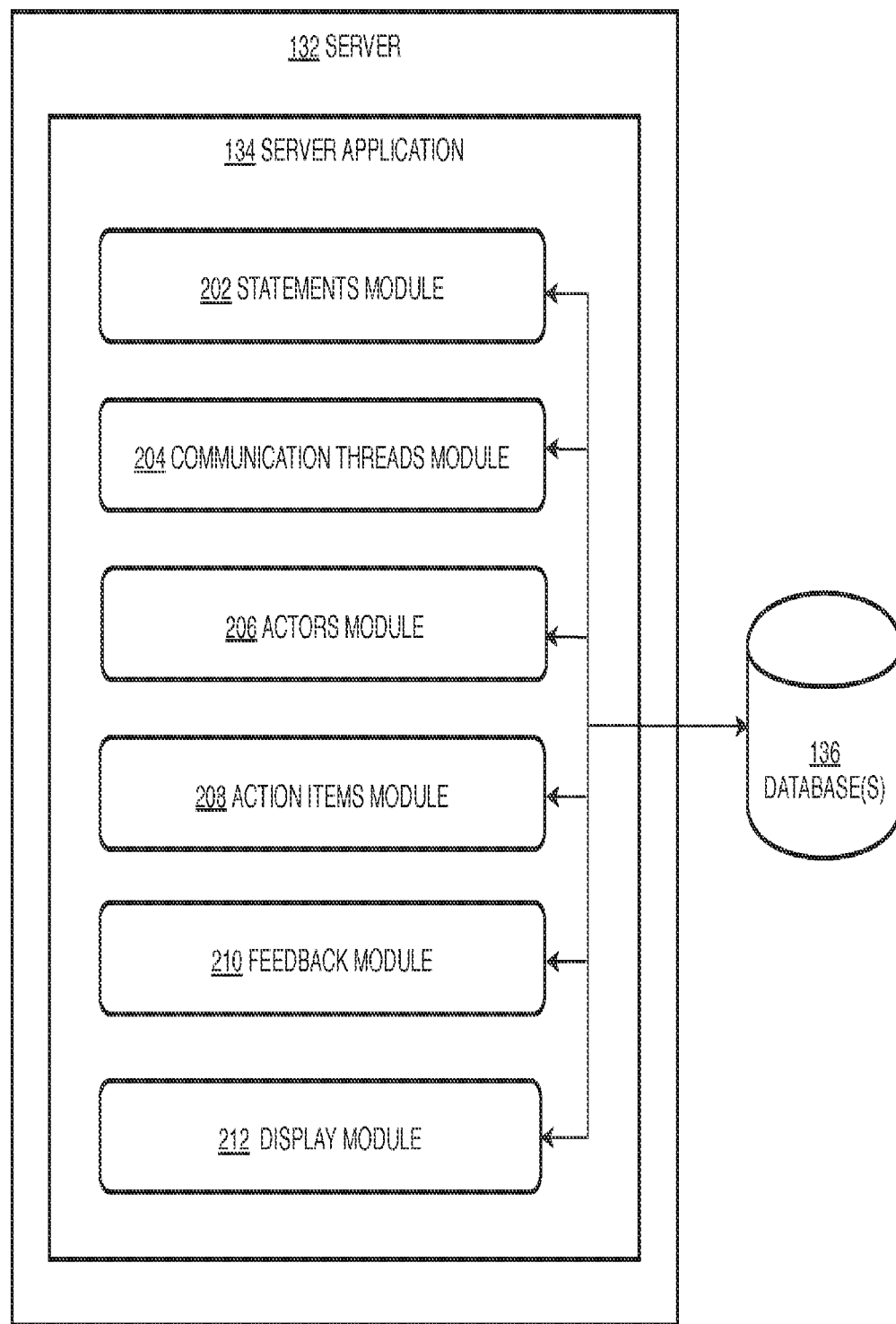
FIG. 2 is a diagram of a server system, in an example embodiment.

FIG. 2 is a diagram of a server system 200, such as server system 130 in FIG. 1, in an example embodiment. The server application 134 contains sets of instructions or modules which, when executed by one or more processors, perform various functions related to structuring unstructured communications information. In the example of FIG. 2, the server system 200 is configured with a statements module 202, a communication threads module 204, an actors module 206, an action items module 208, a feedback module 210, and a display module 212, as further described herein. While six modules are depicted in FIG. 2, the embodiment of FIG. 2 serves as an example and is not intended to be limiting. For example, fewer modules or more modules serving any number of purposes may be used.

One or more modules use machine learning algorithms or models. In some embodiments, all the above modules comprise of one or more artificial intelligence (AI) models. For instances, any of the modules of FIG. 2 may be one or more: Deep Neural Networks (DNN), XLNet for Natural Language Processing (NLP), General Language Understanding Evaluation (GLUE), Word2Vec, Convolution Neural Networks (CNN), Long Short-Term Memory (LSTM) networks, Gated Recurrent Unit (GRU) networks, Hierarchical Attention Networks (HAN), or any other type of machine learning model. The AI models listed herein serve as examples and are not intended to be limiting.

Each of the AI models are trained using training data. Using a standard neural network as a general example of an AI model, a neural network utilizes an input layer, one or more hidden layers, and an output layer to train the machine learning algorithm(s) or model. In some embodiments, where the outputs have already been labeled and confirmed, supervised learning is used such that known input data, a weighted matrix, and known output data are used to gradually adjust the model to accurately compute the already known output. In other embodiments, where the output data has not yet been confirmed, unstructured learning is used such that a model attempts to reconstruct known input data over time in order to learn.

Training of the above neural network example using one or more training input matrices, a weight matrix, and one or more known outputs is initiated by one or more computers associated with the collaboration system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server then re-computes another output from the deep neural network with the input training matrix and the adjusted weight matrix. This process continues until the processor output matches the corresponding known output. The server then repeats this process for each training input dataset until a fully trained model is generated. For the purposes of this disclosure, the AI models further described herein may be trained using publicly available data, company-specific data, and/or synthetically generated training data.

In some embodiments, the AI models described herein are domain adaptation machine learning models that are configured to generate domain-specific neural networks. Domain adaptation (DA) involves customizing one or more trained based models, which are trained on generalized training data, for use in specific, targeted distributions or domains. For example, a base neural network, which is trained on one or more general data, may be subsequently custom-tailored to generate neural networks for specific domains and subdomains, such as various types of industries, business sectors or verticals within these industries, specific companies within each business sectors, departments within these specific companies and/or social groups within each specific company, or any other domain and/or subdomain. In some embodiments, DA may include supervised domain adaptation, semi-supervised domain adaptation, and/or unsupervised domain adaptation.

In some embodiments, DA generates a different neural network head, or apex of the neural network, for each domain or subdomain, allowing for customization to each industry, business sector or vertical, company, company department, user social groups within a company, and so forth. This technique has the benefit of domain-specific customization with low overhead as any number of neural network heads and associated neural networks may be used in DA for any number of domains and/or sub-domains.

For instance, a universal base neural network may be trained using one or more general corpora, such as email, instant messages or chat messages, SMS or MMS text messages, transcripts generated from audio and/or video, documents, images, attachments, metadata or any other type of corpus. The universal base neural network may then be configured with one or more heads for their respective one or more domains or subdomains. For example, a domain may include the health industry, the technology industry, the retail industry, or any other types of industries. Each of these industries have industry-specific or domain-specific terms and communication patterns that are learned. A subdomain may include different types of business sectors within those industries. For example, the health industry may include the pharmaceutical business, the clinical testing business, the consumer-facing healthcare business, or any other subdomain. The technology industry may include the telecommunications business, the online banking business, the computer hardware business, or any other subdomain. Similarly, each of these businesses may have business-specific or subdomain-specific terms and communication patterns that are learned. A sub-subdomain may include different companies within these businesses. Each company may have company-specific or sub-subdomain-specific terms and communication patterns that are learned. Each company, in turn, may have various departments, geophysical locations, social groups or cliques, or any other sub-sub-subdomain that may be customized per company. Any number of sub-level domains may be used.

Moreover, DA allows for expedient corrections at a domain or sublevel domain level. In some embodiments, fine tuning of any of the neural networks corresponding to any of the heads may be done using live backpropagation techniques. For example, parameters within each neural network are dynamic (i.e. not fixed) and can be adjusted using user feedback, as further described herein. In some embodiments, if users correct any data or provide any form of feedback, the neural network weights are adjusted in real-time. In an embodiment, a static or dynamic learning rate for each of the neural networks may be configured such that if enough corrections or adjustments are received from one or more users, the behavior of the neural network may be changed to produce different outputs.

In some embodiments, the learned behavior of each of the models may be compared with baselines for common industry behavioral standards. For example, if a learned feature is common for more than N number of companies, then the learned feature may be a standard for those types of companies. As a result, neural networks for all other companies with similar profiles may be brought into compliance with industry standards without the need to obtain private data from those companies.

While the above examples describe neural networks, the example is not intended to be limiting. The AI models described herein may be any other type of machine learning model that uses one or more inputs to generate one or more outputs. Once an AI model is trained, field or live data is applied as input to the model and a predicted output is generated. For the purposes of this disclosure, the content fed into each of the modules are example machine learning input data and the content produced by the modules are example machine learning output data, as further described herein.

Returning to FIG. 2, in some embodiments, the content or information produced by any of the modules are produced and processed in real-time for subsequent display or consumption, without storage in database 136. For example, when the AI models process confidential personal information in order to generate actionable items and global graphs, the confidential personal information may not be stored for security purposes. As another example, global graphs generated by communication threads module 204 and actionable items generated by the action items module 208 may be sent directly to the display module without storage in database 136. In other embodiments, any content produced by any of the modules may be stored in database 136 and subsequently accessed by any other module. For example, global graphs and actionable items may be stored in database 136 and accessed for subsequent processing and/or displaying by the display module 212. Any data stored in database 136 may be accessed by any of the modules for further processing. Moreover, any data generated by any of the modules may be accessed by any of the module, in any sequence.

Figure 3:
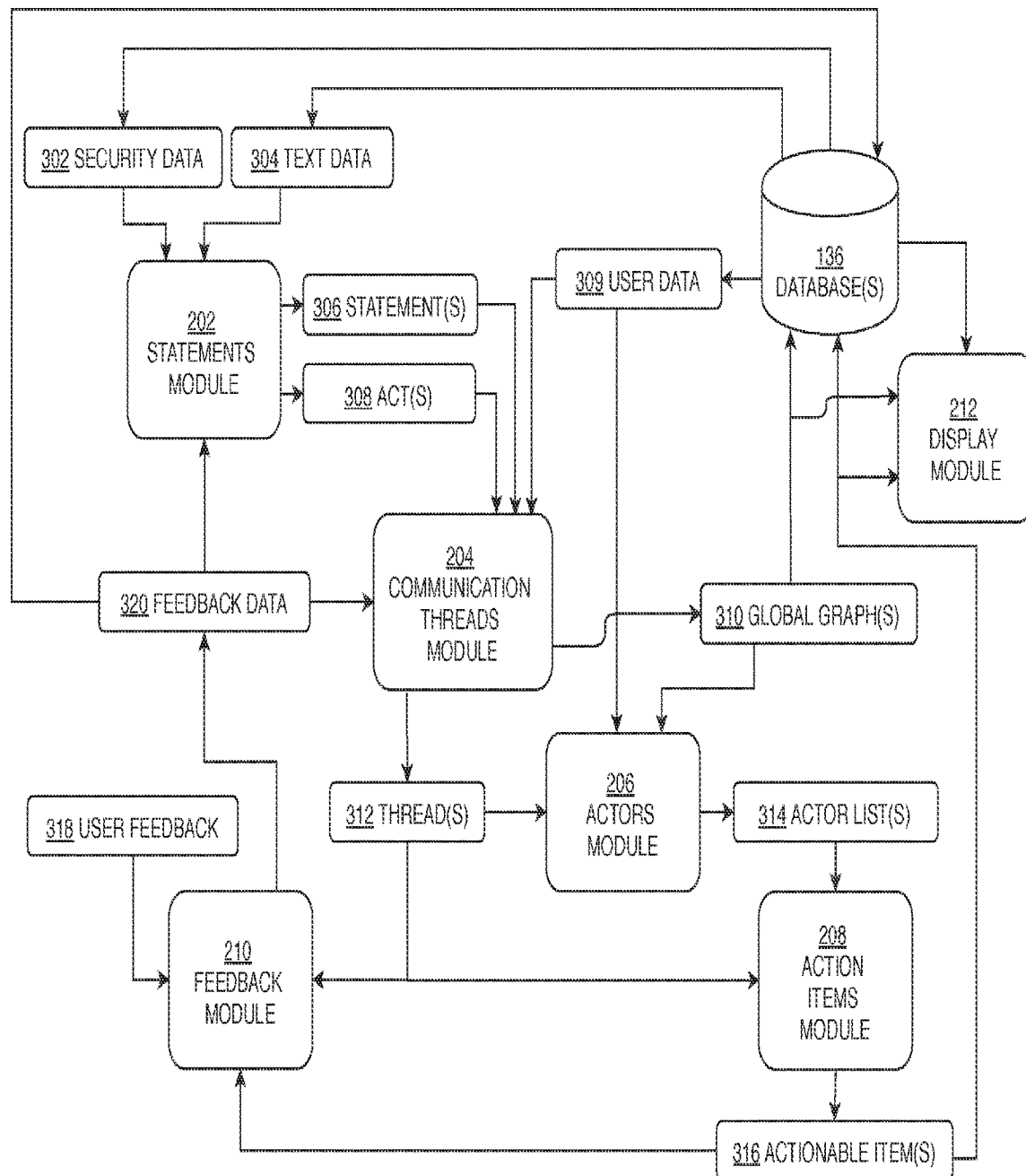
FIG. 3 is a block diagram of a content workflow system, in an example embodiment.

FIG. 3 is a block diagram of an example content workflow system 300 for structuring unstructured information. The embodiment of FIG. 3 serves as an example and is not intended to be limiting. In the example of FIG. 3, the statements module 202 receives security data 302 and/or text data 304. In some instances, the security data 302 and/or text data 304 is obtained from one or more databases 136, as depicted, while in other instances, the security data 302 and/or text data 304 is obtained directly from real-time communications. The text data 304 is text-related data derived from e-mails, instant messages, group messages, documents, links, transcripts, tasks, image descriptions, or any other textual data. In some embodiments, text data 304 may also be derived from audio, video, or any other sources of data. For example, the statements module 202 may generate text data 304 by transcribing audio from telephony communications and/or video conferencing communications into text for subsequent processing. The security data 302 is any data related security and/or privacy, including contextual security data such as access lists, data permissions and roles, private and public flags, Lightweight Directory Access Protocol (LDAP) access, as well as participant authentication, access, privacy, and data security, or any other security and/or privacy data.

In some embodiments, the security data 302 directly corresponds to a particular level of security that was originally applied to the text data 304, such as a message, SMS or MMS text, attached file, or any other information. In an embodiment, the security data 302 is inherited by all data derived from the original text data 304. For example, if a team messaging group has a security access setting of "private" in the native team messaging application, then any text data 304 from that team messaging group is paired with its corresponding security data 302 such that the textual data inherits the originally applied security setting for subsequent processing and/or displaying. Any users who are not authorized to access original information from the private team will not be able to access processed information from the private team. Consequently, any users that request access to any subsequently processed data will have access levels that correspond to the users' original security level. As another example, if a team message group has a security setting of "public" in the native team messaging application, then any user, including users who have not been added to the public group, would have access to the data and will benefit from any metadata, searches, and notifications derived from the data of the public group.

The statements module 202 is an AI model that processes the security data 302 and text data 304 in order to generate one or more statements 306 and one or more acts 308. In some instances, the statements 306 and their corresponding acts 308 are paired, herein referred to as statement-act pairs. In an embodiment, the statements module 202 uses NLP to split text data 304 into individual segments, or statements 306. In an embodiment, since the statements 306 are based on the text data 304, each statement 306 inherits the same security settings or security data 302 associated with the text data 304. In some embodiments, the statements module 202 uses machine learning techniques, such as a deep neural network, to classify statements 306 into acts 308, as further described herein. The statements 306 and acts 308 are subsequently sent to the communication threads module 204, as further described herein.

In some embodiments, user data 309 from internal sources, such as internal organization charts, is obtained from database 136. In an embodiment, an organizational chart may include information on all employees of an organization, including names, job titles, departments, relative relationships to one another (i.e.—supervisor, direct report, peer, etc.), contact information such as email addresses and phone number, seating arrangements, building locations, geophysical location, and so forth. In other embodiments, user data 309 from external sources, such as CRM, ERP, project management, source code management, or any other external sources, is obtained from their respective databases 136. In some embodiments, user data 309 may be any data relevant to the user. The statements 306 and acts 308, as statement-act pairs, as well as the user data 309 are subsequently used by the communication threads module 204, which is an AI model, to generate one or more global graphs 310 and/or one or more threads 312. Threads 312 are groupings of activities that track different communications among users in a single communication stream. For example, a single communication stream or channel, such as an email chain or a chat team, may feature multiple users engaged in multiple discussions or communications. Each of these multiple discussions or communications are grouped to generate respective communication threads 312. Therefore, a single communication stream may be split into one or more conversation groupings, or threads 312. Global graph (s) 310 are graphs that shows various objects, such as principals, users, actors, threads, tags, and so forth, and their relationship with each other. In some embodiments, the global graph may be stored in database 136 for subsequent retrieval and display. In other embodiments, the global graph is sent directly to the display module 212 for processing and displaying. In some embodiments, the global graphs 310 are sent to the actors module 206 for subsequent processing, as further described herein. Similarly, the threads 312 are sent to the actors module 206, action items module 208, and/or feedback module 210 for further processing, as further described herein.

The actors module 206 is an AI model that receives the global graphs 310, the threads 312, and additional user data 309 such as data from CRM, ERP, project management, source code management, or any other external sources from database 136, and uses them to determine one or more actor lists 314. An actor may be a user, a computer, an AI bot, or any other system that consumes the content of the communication information and subsequently acts upon it. In some embodiments, the actor list 314 includes users' full names, usernames, handles, email addresses, or some other identifier of the users who consume the information. In other embodiments, the actor list 314 includes Media Access Control (MAC) addresses, Internet Protocol (IP) addresses, or any other identifier of one or more computers in a system that is configured to process or consume the information. In some embodiments, the actor list 314 includes identifiers for AI bots, personal assistants, IoT devices, and/or any other system that acts upon provided information. The actors module 206 then sends the actor list 314 to the action items module 208 for further processing, as further described herein.

The action items module 208 is an AI model receives the actor list 314 from the actors module 206 as well as threads 312 from the communication threads module 204 and uses them to generate one or more actionable items 316. The actionable items 316 may be one or more action items, tasks, requests, prioritized messages or lists, to-do lists, check lists, reminders, alerts, notifications, calendar invites, meeting invitations, or any other actionable items directed to, consumed by, or otherwise involving the actors in the actor list 314. In some embodiments, the actionable items 316 are stored in database 136 for subsequent retrieval and display. In other embodiments, the actionable items 316 are sent directly to the display module 212 for processing and displaying. The actionable items 316 are sent to the feedback module 210 for subsequent processing, as further described herein.

The feedback module 210 is an AI model that receives the actionable items 316 from the action items module 208, threads 312 from the communication threads module 204, as well as user feedback 318 through client devices, such as client devices 112A, 112B of FIG. 1. In some embodiments, user feedback 318 includes direct or indirect feedback from users, such as text responses, multiple choice responses, transcriptions of audio or voice responses, emoticons, messages sent or not sent, messages read or not read, events accepted or not accepted, or any other types of feedback. In an embodiment, the feedback module 210 uses the threads 312, actionable items 316, and user feedback 318 to generate feedback data 320. The feedback data 320 is data that has been processed and standardized such that the data can be fed back into the statements module 202 and communication threads module 204. The feedback data 320 is designed as additional input for improving the AI models.

Each of the modules discussed in relation to FIG. 2 and FIG. 3 above are described in further detail herein.

3.1 Statements Module

Figure 4:
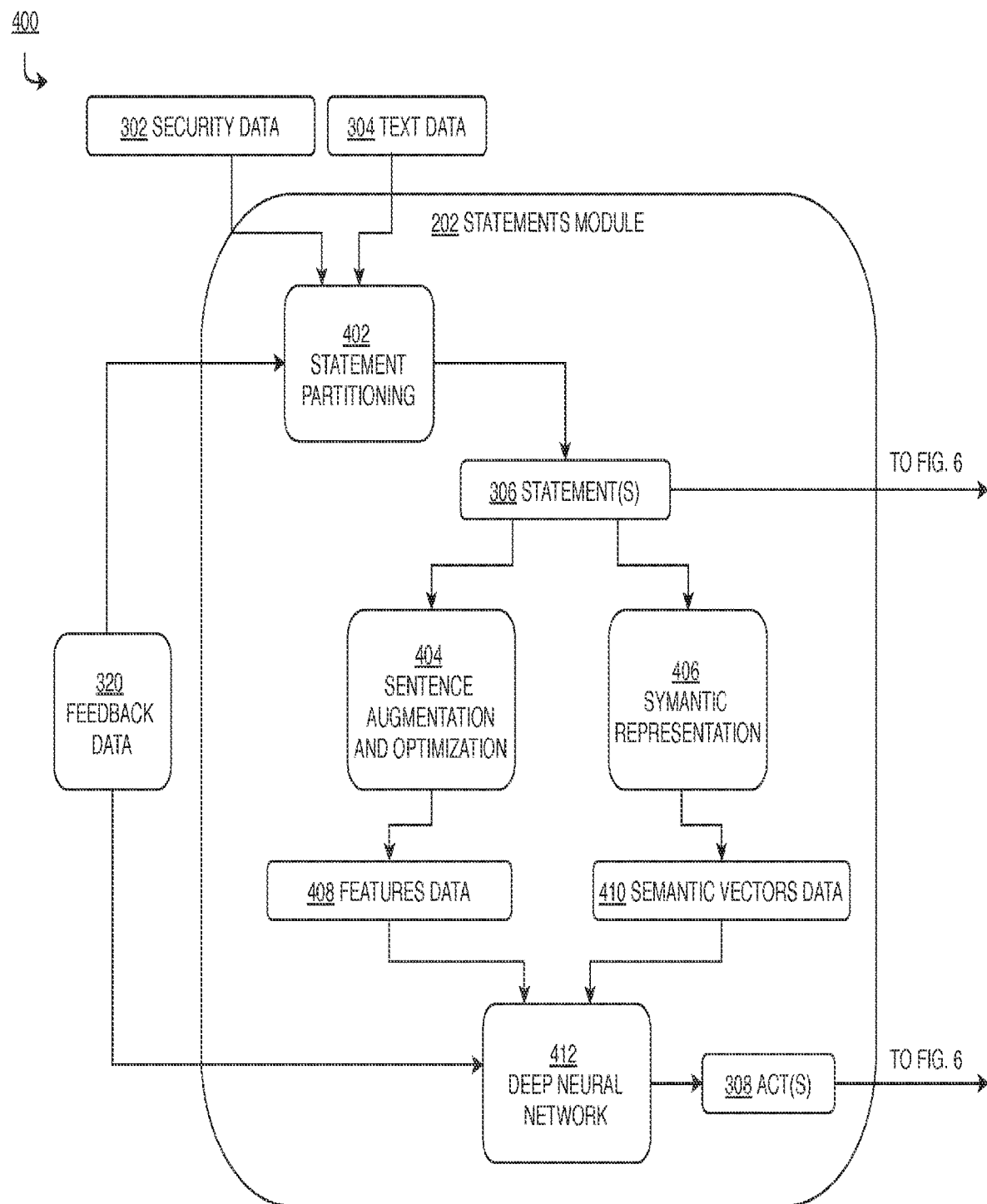
FIG. 4 is a block diagram depicting a statements module, in an example embodiment.

FIG. 4 is a block diagram 400 depicting a statements module 202, in an example embodiment. The statements module 202 is an AI model that receives raw text data 304 and/or security data 302 and generates statements 306, each statement with its associated security context. As an example, the raw text data 304 may include the text "Hello, I cannot log in to the website. Is this normal behavior?" which is associated with a user-level access credentials. The statements module 202 has a set of instructions for statement partitioning 402, which is applied to the text data 304 to generate two segments or statements: (1) "Hello, I cannot log in to the website" and (2) "Is this normal behavior?"

The statements module 202 is also configured with additional AI models for sentence augmentation and optimization 404 as well as semantic representation 406, which are applied to each of the statements 306. In an embodiment, sentence augmentation and optimization 404 augments and optimizes statements 306 in order to reduce the corpora size and produce features data 408 as output data. Features data 408 is data pertaining to features or measurable characteristics of particular statements 306, such as whether a statement 306 is a question, whether the statement 306 was sent by the same sender, whether the statement 306 references the same or different principals, whether there are any attachments, the length of time between the sending of messages, and so forth. In some embodiments, features data 408 represents the presence or absence of certain features. In some embodiments, the features are customizable and selected and/or human-tailored by system designers. In an embodiment, semantic representation 406 is a statement encoder that produces corresponding semantic vectors data 410 for each statement 306. Semantic vectors data 410 is data related to representing semantics or language as relational vectors in multi-dimensional space. In some embodiments, the semantic vectors data 410 and/or features data 408 are organized as matrices with the features data 408 augmenting the semantic vectors data 410.

In an embodiment, both the features data 408 and semantic vectors data 410 are fed into a deep neural network 412 as input data. The deep neural network 412 subsequently generates acts 308 as output data. Acts 308 are categories or types of actions that are associated with specific statements 306. For example, acts 308 that correspond to each statement 306 may include: an acceptance (e.g. "will do"), an action directive (e.g. "please make this work"), a declaration (e.g. "master build failing"), a continuation (e.g. "and cats"), a farewell (e.g. "bye"), a greeting (e.g. "hello Bill"), a rejection (e.g. "no way"), a question (e.g. "how do you do this?"), an answer (e.g. "you use a wrench"), a task completion (e.g. "I've done what you asked for"), thanking (e.g. "thanks"), an emotion (e.g. "lol;)"), or any other type of act 308.

Figure 5:
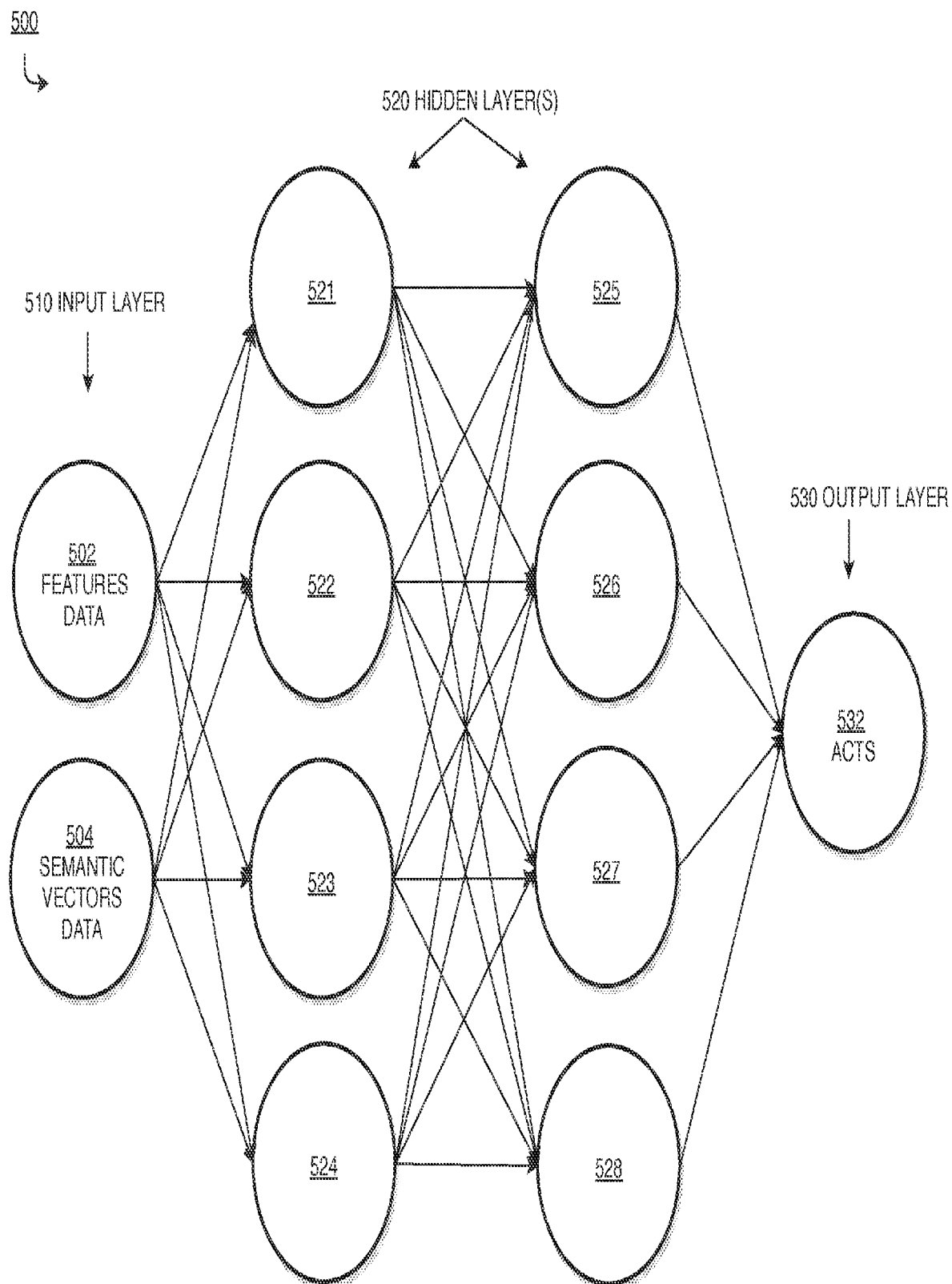
FIG. 5 is a relational node diagram depicting a neural network, in an example embodiment.

FIG. 5 is a relational node diagram 500 depicting an example of a deep neural network 412 that is trained to determine the acts 308 of FIG. 4 based on the statements 306 of FIG. 4, in accordance with some embodiments. FIG. 5 is described as a structured learning neural network model for depiction purposes and is not intended to be limiting.

In the example of FIG. 5, the input layer 510 includes features data 502 such as the features data 408 of FIG. 4, semantic vectors data 504 such as the semantic vectors data 410 of FIG. 4, as well as any other relevant input data. In some embodiments, the input data may be field or live data that is accumulated in real time. In other embodiments, the field data may be current data that has been saved in an associated database 136. The trained AI model is applied to the field data in order to generate one or more acts at the output layer 530.

Hidden layers 520 represent various computational nodes 521, 522, 523, 524, 525, 526, 527, 528. The lines between each node 521, 522, 523, 524, 525, 526, 527, 528 represent weighted relationships based on a weight matrix. While the embodiment of FIG. 5 features two hidden layers 520, the number of hidden layers is not intended to be limiting. For example, one hidden layer, three hidden layers, ten hidden layers, or any other number of hidden layers may be used for a standard or deep neural network.

The example of FIG. 5 also features an output layer 530 with the acts 532 determined by the neural network as the known output. The acts 532 of FIG. 5 are the acts 308 of FIG. 4. The acts 308, 532, as well as the statements 306 of FIG. 4 are subsequently sent to the communication threads module 204 as statement-act pairs for further processing, as further described herein.

3.2 Communication Threads Module

Figure 6:
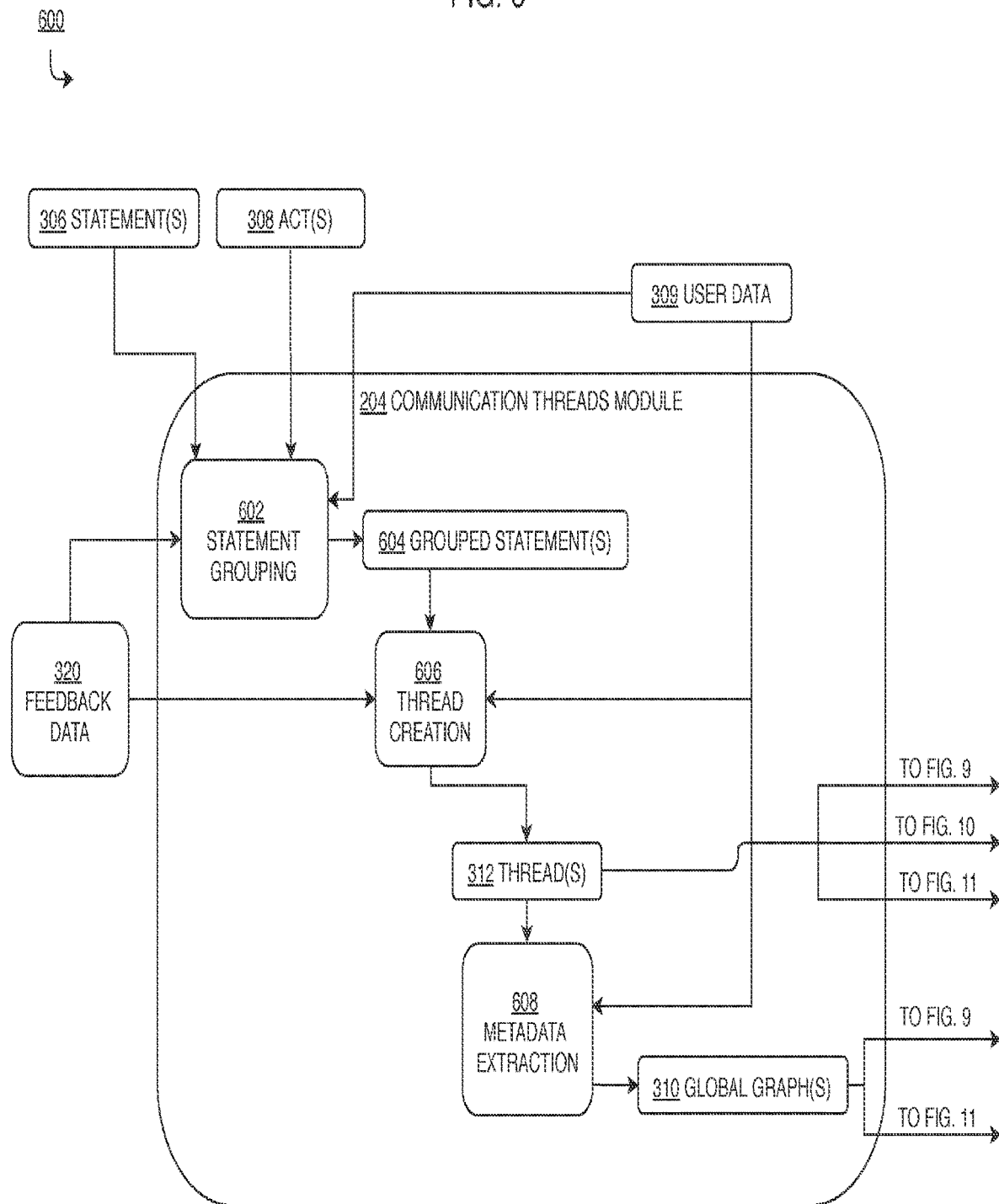
FIG. 6 is a block diagram depicting a communication threads module, in an example embodiment.

FIG. 6 is a block diagram 600 depicting a communication threads module 204, in an example embodiment. The communication threads module 204 is an AI model that receives the statements 306, acts 308, and user data 309 of FIG. 3 and FIG. 4 and generates global graphs 310 and/or threads 312.

In an embodiment, the statement-act pairs generated by the statements module 202 are fed into the communication threads module 204. The statements grouping 602 AI model receives user data 309 such as full names, contact information, images, avatars, job titles, departmental charts, organizational charts, external customer information, any messaging teams, groups, forum, or channels that the user is a member of, or any other user data stored in one or more customer databases, such as database 136. In some embodiments, the statements grouping 602 model also receives feedback data 320 from users, as further described herein. The statements grouping 602 model applies the user data 309 and/or feedback data 320 to the statements 306 and acts 308 to generate grouped statements 604, which are grouped together by one or more characteristics. These characteristics may include, for example, topic, semantic relationship, time, participants, actors, built-in or dynamically learned heuristics, and/or any other characteristic.

For example, if a first message regarding a finance meeting is sent via a group chat while a second message regarding the same finance meeting is sent via a direct chat message, the statements grouping 602 model will identify that the two messages are related to the same topic (i.e. the finance meeting) and group them together on a logical level. In some embodiments, the temporal relationship between statements 306, are factored into the grouping. In the example above, if the first message regarding a finance meeting is sent via a group chat at 8:00 AM on a Monday and the second message regarding the finance meeting is sent via a direct chat message at 8:00 AM on the following Monday, the one-week time lapse suggests that the messages relate to two separate finance meetings, such as weekly heart-beat meetings. Consequently, the two messages will be grouped separately. This time lapse between statements 306 may be adjusted such that any statements within a certain time period may be grouped or ungrouped. For instance, statements 306 relating to the same topic may be grouped separately if they are sent more than 10 hours apart, 20 hours apart, 30 hours apart, or any other time period apart. In another example, statements 306 relating to the same topic may be grouped together if the statements 306 are sent are no more than five minutes apart, three hours apart, five hours apart, or any other time period apart.

In some embodiments, the relationship between the acts 308 associated with each statement 306 are used to group the statements. For example, if a statement 306 "How do you do this?" is labeled as a "question" type of act 308, and a subsequent statement 306 "You use a wrench" is labeled as an "answer" type of act 308, the response to the question suggests that the statements 306 relate to the same topic. Consequently, the statements grouping 602 model may group the statements 306 by topic using their corresponding acts 308. Any number of grouping characteristics may be used to generate grouped statements 604. Once the statements are grouped, the grouped statements 604 are used by the threads creation 606 model to generate threads 312, as further described in FIG. 7 and elsewhere herein.

Figure 7:
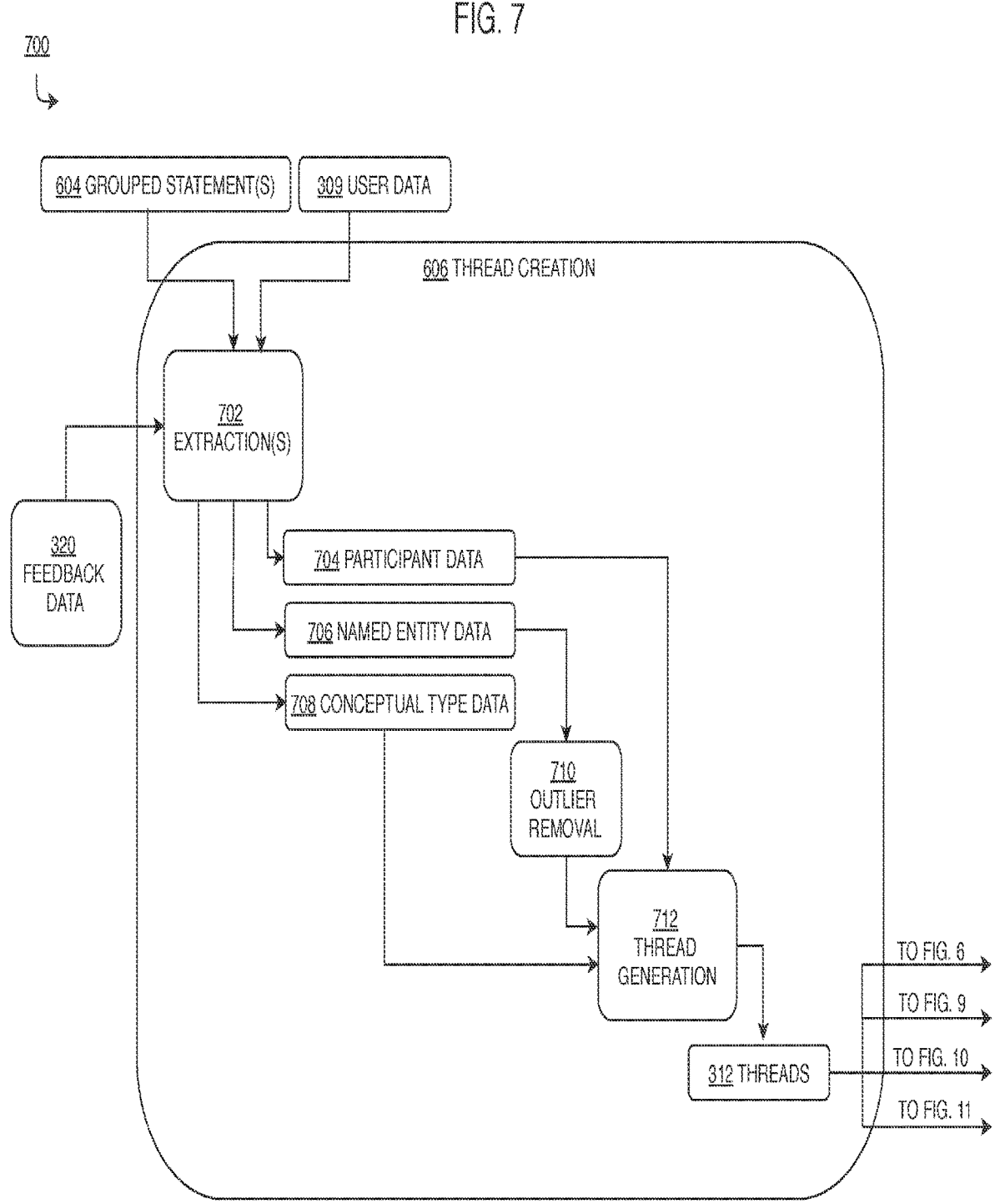
FIG. 7 is a block diagram depicting a thread creation model of the communication threads module, in an example embodiment.

Moving to FIG. 7, block diagram 700 depicts thread creation 606, in an example embodiment. One or more extraction 702 models take the same group statements 604 from FIG. 6 and user data 309, such as full names, contact information, images, avatars, job titles, departmental charts, organizational charts, external customer information, any messaging teams, groups, forum, or channels that the user is a member of, and so forth. In some embodiments, feedback data 320 can also be used to refine each of the extractions, as further described herein.

In an embodiment, the extraction 702 model outputs participant data 704, named entity data 706, and/or conceptual type data 708. Participant data 704 is data pertaining to one or more participants or principals involved in a discussion. In some embodiments, the names of the principals or participants appear in the grouped statements 604 as text. For example, a grouped statement 604 may include the directive "Let's get Tim's approval" even if Tim is not a direct participant in the discussion. In other embodiments, the principals are active participants in the discussions. In the example above, a grouped statement 604 may include the question "Do you approve Tim?" which is directed at Tim as an active participant in the discussion. In some embodiments, participants may be human users, AI bots, personal assistants, IoT devices, and/or any other system. In some embodiments, participant data 704 includes identifiers for participants, such as full names, usernames, email addresses, MAC addresses, IP addresses, or any other participant identifier. Named entity data 706 is data identifying any proper nouns, such as geographical locations (e.g. "New York"), organizations, business names, business entities, subsidiaries, currencies (e.g. dollar "$"), or any other named entity. In some embodiments, named entity data 706 identifies numerals. Conceptual type data 708 is data pertaining to contextual categories or types of specific discussions. For example, discussions may be related to: politics, travel, business, project discussions, scheduling events, problem descriptions such as a customer complaint, hate speech, casual welcome luncheons, or any other conceptual types. In an embodiment, the extraction 702 is done using three different AI models that are configured to extract the participant data 704, named entity data 706, and conceptual type data 708, respectively. Any number of AI models may be used to extract the relevant information.

In some embodiments, an outlier removal 710 is applied to the named entities data 706 that are produced by the extraction 702. In an embodiment, the outlier removal 710 involves encoding communication threads in an N-dimensional word vector space using a pre-calculated word vector space. In some embodiments, algorithms such as continuous back-of-words or skip-gram architectures for computing vector representations of words are used. In an embodiment, an average vector space of a communication thread, as well as the distance from the vector space to each named entity, are calculated. The named entity may be encoded using the same vector space. In an embodiment, a named entity's normal uses in terms of content is used for the vector space calculation. For example, standard uses of a name entity may be determined using ontology system (e.g. a wiki knowledge base). In an embodiment, based on these calculations, the outlier removal 710 will remove low-scoring named entities from the named entities data 706 prior to thread generation 712. As an example, search algorithms often misidentify a news article about the Syrian Civil War as an article about the U.S. Civil War because the Syrian Civil War article features the terms "U.S." and "Civil War." However, applying this outlier removal 710 enables the communication threads module 204 to assign a low score to "U.S. Civil War," thereby allowing discussions about the U.S. Civil War to be removed from the communication thread about the Syrian Civil War.

Subsequently, a thread generation 712 model generates enriched communication threads 312 using the participant data 704, named entity data 706 with outliers removed, and conceptual type data 708. The threads 312 are subsequently used by the communication threads module 204 for further processing, the actors module 206, the action items module 208, and the feedback module 210, as further described herein.

Returning to FIG. 6, once the threads 312 are generated, the communication threads module 204 initiates metadata extraction 608 from user data 309. In an embodiment, metadata includes tags, keywords, groups, participants, or any other metadata. The extracted metadata is used to enrich the threads 312 and generate global graphs 310 for visualizing communications, as further described herein. In an embodiment, one or more sub-graphs are generated. The sub-graphs may be customizable by topic, department, company, social cliques, or any other factor. In some embodiments, the global graph 310 is generated by combining the sub-graphs based on topics, terms, users, or any other factor.

Figure 8A:
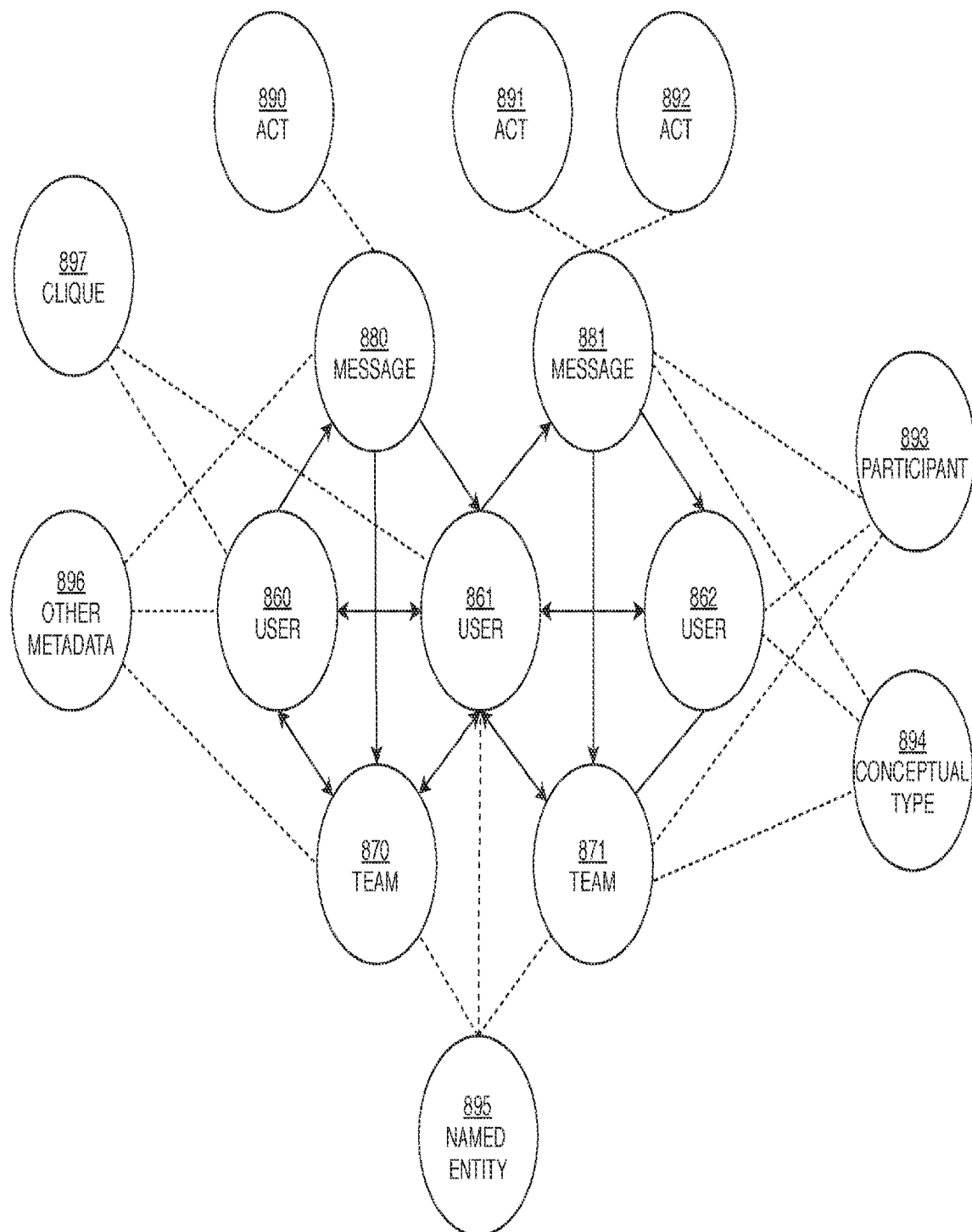

FIG. 8A is a relational node diagram 800A depicting a global graph 310, in an example embodiment. In some embodiments, the information available as nodes and/or lines may be expanded upon or limited based on the security settings available to each user.

In the embodiment of FIG. 8A, any information available from or derived from communications may be represented as nodes. For example, user(s) 860, 861, 862, devices corresponding to the users, team(s) 870, 871 or channels within a messaging application, and the content of message (s) 880, 881, such as the source text of chat messages, team messages, SMS or MMS messages, email correspondences, attachments, or any other content, are depicted as nodes. Users 860, 861, 862 may be the one or more users 110A, 110B of FIG. 1, in an example embodiment. While the example of FIG. 8A depicts three user nodes, two team nodes, and two message nodes, the number and type of nodes are not intended to be limiting. Any number and any type of nodes may be depicted.

Moreover, any relational information between nodes may be represented as lines. While the embodiment of FIG. 8A features unlabeled lines, the lines may be labeled with relational information for subsequent display to one or more users, as further described herein. In this embodiment, solid lines represent direct actions or direct relationship between and among nodes. Dotted lines represent any relational information that is derived, extracted, or calculated, as further described herein. Any of the nodes, solid lines, and/or dotted lines may be labeled, color-coded, bolded, or otherwise demarked to illustrate activities and relationships between and among various nodes. In some embodiments, any number of lines and any number of nodes may be used.

The solid lines of FIG. 8A represent direct actions or relationships between nodes. For example, the line and arrow between user 860 and message 880 indicates that the user 860 sent a message 880. In some embodiments, the global graph 310 may include line labels indicating the activity or relationship. In this example, the line between user 860 and message 880 may be labeled: "Sent message 880." The line and arrow between message 880 and user 861 indicates that message 880 was directed at and/or received by user 861. This line may be labeled: "Received message 880." The line and arrow between message 880 and team 870 indicates that the message 880, which was directed at user 861, was posted to team 870. The line may be labeled: "Message 880 posted to team 870." In some embodiments, the arrows may also be color-coded, bolded, labeled, or otherwise demarked to illustrate the flow of sending and receiving communications from one user to another or one device to another.

In some embodiments, user 860 and user 861 directly communicate with each other through a direct messages, an email, text, or some other communication, as represented by the solid line and arrow directly between user 860 and user 861. In the embodiment of FIG. 8A, the direct message between user 860 and 861 may not be presented as a node because the content of the message may be hidden due to security data. In another embodiment, the line between user 860 and user 861 may be a dotted line. The dotted lines of FIG. 8A indicate extraction, derivation, and/or calculation of various data or properties that may or may not appear as nodes themselves. In the example where the line between user 860 and user 861 is dotted with an arrow pointed toward user 861, the dotted line may indicate the number of sent action directives, for example, from user 860 to user 861. In some embodiments, a separate dotted line between user 860 and user 861 with an arrow pointing from user 861 to 860 may indicate the number of sent action directives from user 861 to user 860, for example.

In the embodiment of FIG. 8A, the lines and arrows between user 860 and team 870, as well as between user 861 and team 870 indicate that user 860 and user 861 both have access to team 870 and associated data available in team 870. In some embodiments, users may have full access, partial access, or no access to certain teams and any information posted in those teams, depending on the security settings. In some embodiments, the lines are labeled with the corresponding access level.

The line and arrow between user 861 and message 881 may indicate that user 861 sent message 881. In some embodiments, the line may be labeled: "Sent message 881." The line and arrow between message 881 and user 862 may indicate that the message 881 that user 861 sent is directed at and/or received by user 862. In some embodiments, this line may be labeled: "Received message 881." The line and arrow between message 881 and team 871 indicates that message 881, which was directed at user 862, was posted to team 871. In some embodiments, the line may be labeled: "Message 881 posted to team 871." In some embodiments, the arrows may also be color-coded, bolded, labeled, or otherwise demarked to illustrate the flow of sending and receiving communications from one user to another or one device to another.

User 861 and user 862 may directly communicate with each other through a direct messages, an email, text, or some other communication, as represented by the lines and arrows between user 861 and user 862. In the embodiment of FIG. 8A, the direct message between user 860 and 861 is not presented as a node because the content of the message may be hidden due to security data. In some embodiment, one or more dotted lines may indicate the exchange of information, which has been extracted, derived, and/or calculated, between user 861 and 862. In the example where a line between user 861 and user 862 is dotted with an arrow pointed toward user 862, the dotted line may indicate the number of sent questions, for example, from user 861 to user 862. In some embodiments, a separate dotted line between user 861 and user 862 with an arrow pointing from user 862 to 861 may indicate the number of sent answers from user 862 to user 861, for example.

In the embodiment of FIG. 8A, the lines and arrows between user 861 and team 871, as well as between user 862 and team 871 indicate that user 861 and user 862 both have access to team 871 and associated data available in team 871. In some embodiments, users may have full access, partial access, or no access to certain teams and any information posted in those teams, depending on the security settings. In some embodiments, the lines are labeled with the corresponding access level.

In some embodiments, act(s) 890, 891, 892, such as the acts 308 of FIG. 3, may be derived from respective message (s) 880, 881, as indicated in the example of FIG. 8A. The dotted line between message 880 and act 890 indicates that act 890 was derived from message 880. Similarly, the dotted lines between message 881 and act 891, as well as between message 881 and act 892 indicate that the acts 891, 892 were derived from message 881. The derivation process may be the same process described in FIG. 3 and FIG. 4 with the statements module 202. In some embodiments, the associated statements 306 from which the acts 308 were derived may as the label for the dotted line. For example, the dotted line between message 880 and act 890 may be labeled with the statement: "Please submit by the end of today." The associated act 890 that was derived from that statement may be labeled as a directive, for example.

In some embodiments, information is derived from various sources and metadata associated with those sources. In the example of FIG. 8A, a participant 893 is determined using information from message 881, user 862, and team 871. The participant 893 may be derived using the communication threads module 204, which extracts participant data 704 during thread creation 606, as further described herein in relation to FIG. 6 and FIG. 7. In the example of FIG. 8A, participant 893 may be user 862 who received message 881 through a posting to team 871. In some embodiments, a participant 893 may be a direct participant in discussions or may be named in discussions without engaging in the discussions.

Similarly, a conceptual type 894 may also be derived using the communication threads module 204, as further described herein in relation to FIG. 6 and FIG. 7. In the example of FIG. 8A, conceptual type 894 may be a topic of conversation, such as an important project, which is derived from message 881 that user 862 posted to team 871.

A named entity 895 may also be derived using the communication threads module 204, as further described herein in relation to FIG. 6 and FIG. 7. In the example of FIG. 8A, named entity 895 may be a city or state, such as San Francisco, Calif., derived from the title of team 870 and team 871. For example, team 870 may be labeled "HR Department—San Francisco" while team 871 may be labeled "Engineering Team—San Francisco." Therefore, the named entity 895 is derived from the names of the teams 870, 871.

In some embodiments, any other metadata 896 derived from the various communication sources, whether depicted as nodes or not, may also be extracted for subsequent display as a node. Other metadata 896 may include, for example, tags, keywords, topics, terms, sentiments, groups, participants, method of sending or receiving messages, time of communication, duration of communication, responsiveness, or any other derivable information. While the example of FIG. 8A depicts deriving other metadata 896 from user 860, team 870, and message 890, any combination of sources, whether depicted as nodes or not, may be used.

In some embodiments, a clique 897 may also be derived using communication information for subsequent display in the global graph 310. A clique may be a social or professional group of individuals with shared interests or commonalities. In some instances, the clique 897 may be social groups that form irrespective of work, while in other instances, the cliques 897 may be professional or work-related groups that form due to work-related communications and interactions. In the example of FIG. 8A, clique 897 indicates that user 860 and user 861 are both members of a social or professional clique 897.

In some embodiments, additional information may be derived from derived nodes to generate an additional layer of derived nodes. For example, message 880, act 890 and clique 897 may indicate a pattern of certain types of messages that are sent between and among members of the clique 897. For example, if message 880 contains negative comments that is sent among members of clique 897 and the associated act 890 is labeled as hate speech, then an additional sentiment node labeled as "Intolerance" may appear with dotted lines connecting message 880, act 890, and clique 897. Consequently, clique 897 may be targeted by the Human Resources department for additional training on diversity, inclusion, and tolerance. Any number of derived nodes may be formed, creating any number of additional outer layers of nodes around the core group of nodes pertaining to users 860, 861, 862, teams 870, 871, and messages 880, 881.

Figure 8B:
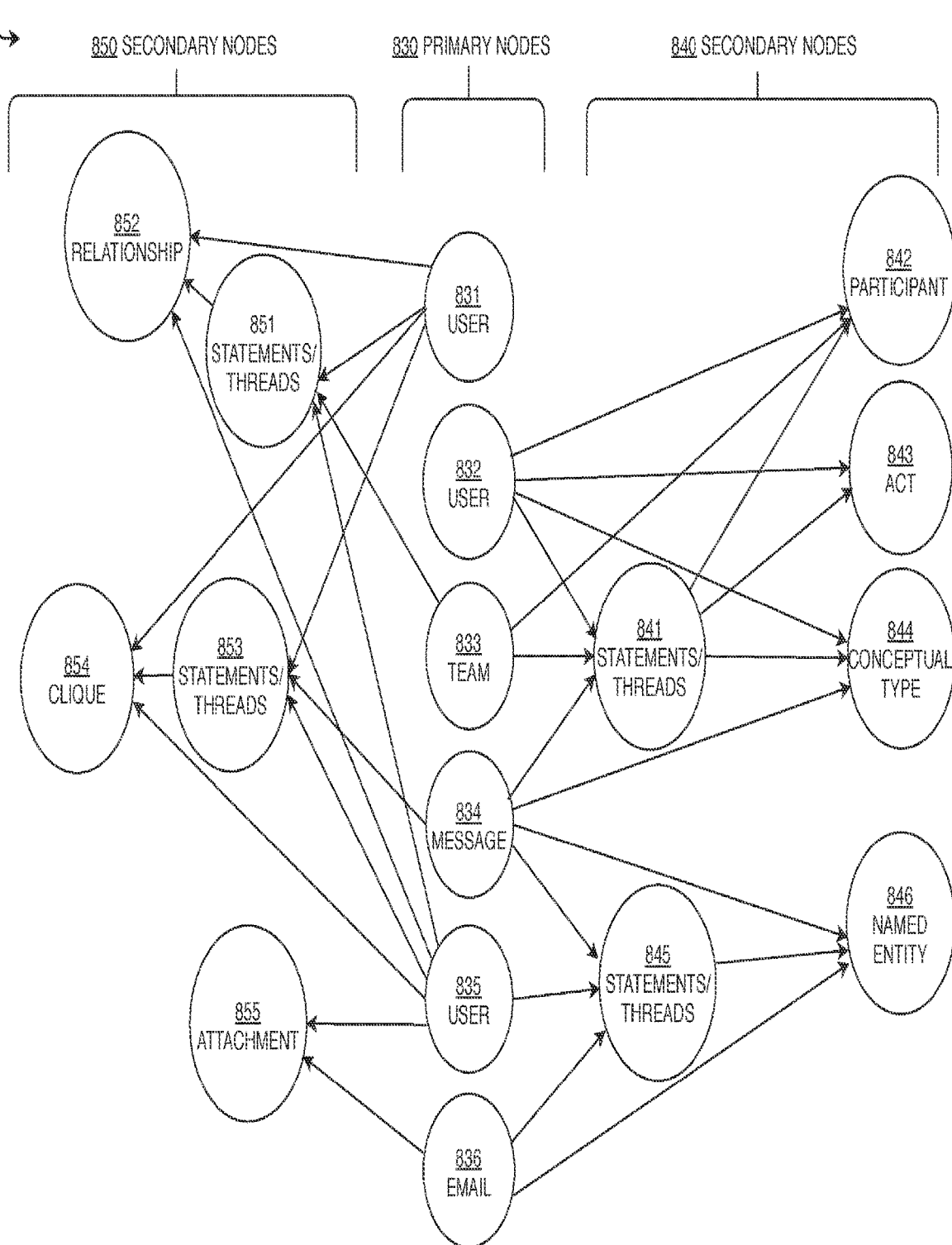

FIG. 8B is another relational node diagram 800B depicting a global graph 310. In the example of FIG. 8B, the global graph 310 visually depicts a series of nodes and their relative relationships with each other in a different manner from FIG. 8A. The diagram 800B is a representative example of one method of organizing and displaying the relationship between nodes in a global graph 310 but is not intended to be limiting.

The nodes are visually separated into primary nodes 830 and secondary nodes 840, 850 for the purposes of this example and are not intended to be limiting. The current secondary nodes may be further separated into tertiary nodes or any other level of nodes. The primary nodes 830 data objects that represent one or more sources of communication information, such as users, communication content, and/or communication teams or groups. Users(s) 831, 832, 835 may be the one or more users 110A, 110B of FIG. 1, in an example embodiment. Communication content may be the content of any communications, such as the source text of message(s) 834 from messaging applications, email(s) 836, SMS or MMS texts, and so forth, as well as attachments such as documents, images, or any other attachments. Communication teams may be team(s) 833 within a messaging application, an email distribution list, or any other communication grouping.

The lines of FIG. 8B represent any and all information originating and gathered from various primary nodes 830 and used to generate additional nodes. The information may be information or data related to communication activities, content, metadata, users, or any other information related to communication from the various nodes from which the lines originate. While not depicted in FIG. 8B, the lines may be labeled with the information that has been taken from the primary nodes 830. The secondary nodes 840, 850 represent any derived data object resulting from the extraction, derivation, and/or calculation of information (represented by the lines) from the primary nodes 830.

In the example of FIG. 8B, one or more statements/threads 841, 845, 851, 853 may be generated off the primary nodes 830. The statement/threads 841, 845, 851, 853 may be the statements 306, acts 308, grouped statements 604, and/or threads 312 further described in relation to FIG. 6 and the communication threads module 204, in some example embodiments.

In the example of FIG. 8B, statements/threads 841 is a secondary node 840 that is derived from information (i.e. lines) related to user 832, team 833, and message 834. In some embodiments, statements/threads 841 are used in conjunction with direct information from user 832 and message 834 to further derive a conceptual type 844. The conceptual type 844 may be derived from the conceptual type data 708 pertaining to types of discussions, as further described herein in relation to FIG. 7. In other embodiments, statements/threads 841 are used in conjunction with direct information from user 832 to determine an act 843. Act 843 may be the act 308 of FIG. 3, in an example embodiment. The derived node for act 843 may be, for example, a listing of all of questions, answers, directives, and so forth from user 832. In another embodiment, statements/threads 841 are used in conjunction with direct information from user 832 and team 833 to derive a participant 842 who participates in discussions in team 833. The participant 842 may be derived from participant data 704 during thread creation 606, as further described herein in relation to FIG. 6 and FIG. 7.

In the example of FIG. 8B, information from message 834, user 835, and email 836 may be used to generate statements/threads 845. Subsequently, statements/threads 845 may be used in conjunction with direct information from message 834 and email 836 to derive a named entity 846. The named entity 846 may be derived from named entity data 706 using the communication threads module 204, as further described herein in relation to FIG. 6 and FIG. 7.

Information from user 831, team 833, and user 835 may be used to generate statements/threads 851, in an example embodiment. Statements/threads 851 may subsequently be used in conjunction with information from user 831 and user 835 to generate a node indicating a relationship 852 between user 831 and user 835. The relationship 852 may be, for example, a direct report and supervisor relationship, a peer to peer relationship, a cross departmental working relationship, or any other type of relationship derived from the communication data and/or metadata.

In another embodiment, information from user 831, message 834, and user 835 may be used to generate statements/threads 853. Statements/threads 853 may subsequently be used in conjunction with information directly from user 831 and user 835 to determine that both users belong to the same clique 854. A clique may be a social or professional group of individuals with shared interests or commonalities. In some instances, the clique 854 may be social groups that form irrespective of work, while in other instances, the clique 854 may be a professional or work-related group that form due to work-related communications and interactions.

In some embodiments, derivative secondary nodes 840, 850 may be generated directly from the primary nodes 830 without the need for additional input from other secondary nodes 840, 850. For example, in the embodiment of FIG. 8B, information from user 835 and email 836 is used to determine an attachment 855 that was sent with the email 836.

In some embodiments, any number of secondary, tertiary, quaternary, quinary, or any other level of nodes may be generated. Information can be pulled from any level into any other level to create additional nodes. In some embodiments, each of the nodes and lines may be drilled into by a user interacting with the global graph 310. In some embodiments, the global graph 310 may change the orientation of nodes and/or lines to better visually represent information that the user is interested in. For example, if a user selections options for visualization from a per-configured menu, then the global graph 310 may provide specific use cases of global graphs 310 that are tailored to user preferences.

FIG. 8C is a relational node diagram 800C depicting a use case of a global graph 310, in an example embodiment. In the example use case of FIG. 8C, the global graph 310 visually depicts any number of clusters or groupings by departments, locations, companies, subsidiaries, user groups, social groups, projects, and/or any other factors obtained from the threads 312 and metadata extraction 608 of FIG. 6. The example of FIG. 8C features two company departments, Research and Development (R&D) 810 and Customer Support Services (CSS) 820. In some embodiments, the departments or other means of grouping are color coded to visually distinguish the groupings. For example, the R&D 810 department may be visually displayed in green while the CSS 820 department may be displayed in blue.

R&D 810 features a series of nodes 811, 812, 813, 814, 815, 816, 817, 818, 819 that each visually represent one or more users, human or otherwise, in an example embodiment. The users may be the users 110A, 110B of FIG. 1, for example. CSS 820 also features a series of nodes 821, 822, 823, 824, 825, 826, 827, 828, 829 that each visually represent one or more users, human or otherwise. In some embodiments, each of the nodes 811, 812, 813, 814, 815, 816, 817, 818, 819, 821, 822, 823, 824, 825, 826, 827, 828, 829 may have an associated user's name or identifier displayed (not depicted). Each line between the nodes 811, 812, 813, 814, 815, 816, 817, 818, 819, 821, 822, 823, 824, 825, 826, 827, 828, 829 represent sent communications between and among the users. The arrows associated with each line indicate which user is sending communications and which user is receiving the communications. For example, the line between node 811 and node 814 represents communication between a first user identified by node 811 and a second user identified by node 814. The arrow pointing towards 814 indicates that the sender of the communication is at node 811 and the receiver is at node 814. The communications may be any form of communications, including text from instant messaging or chat, text messages, email, telephony transcripts, video conferencing transcripts, and so forth.

In the example of FIG. 8C, certain nodes 814, 819, 825 are depicted as thicker circles with thicker communication lines. This depiction represents communication bottlenecks, such as missing communications, unanswered questions, a slow response time, and so forth. Any number of factors may be used to determine a bottleneck. In some embodiments, a slow response time may be preconfigured and measured in milliseconds, seconds, minutes, hours, days, or any other increment of time. While the bottlenecks in the example of FIG. 8C are depicted by thicker circles and lines, the bottlenecks may be visually displayed in any manner to indicate problematic communications. For example, all bottlenecks may be red in color for visual display, or color-coded different colors depending on the type of bottleneck.

In other embodiments, the global graph 310 labels users based on their role in facilitating communications within a team, department, or company. Some users may have different communication roles, such as knowledge wizard, contributor, influencer, gatekeepers, leaders, disruptors, and so forth. In some embodiments, these communication roles may be determine based on communication patterns. For example, leaders often exhibit specific types of communication patterns, which is depicted in the global graph 310 as a user node that receive numerous amounts of communications but sends a limited number of communications. The limited number of sent communications are often directives, in the case of leaders. As another example, knowledge wizards are often depicted as nodes at the center of communications with a variety of different users, units, or departments. In an embodiment, users of different roles may be color coded various colors in the global graph 310 for visual display purposes.

Once generated, the global graphs 310 are sent to the actors module 206 for further processing and/or the display module 212 for displaying, as further described herein.

3.3 Actors Module

Figure 9:
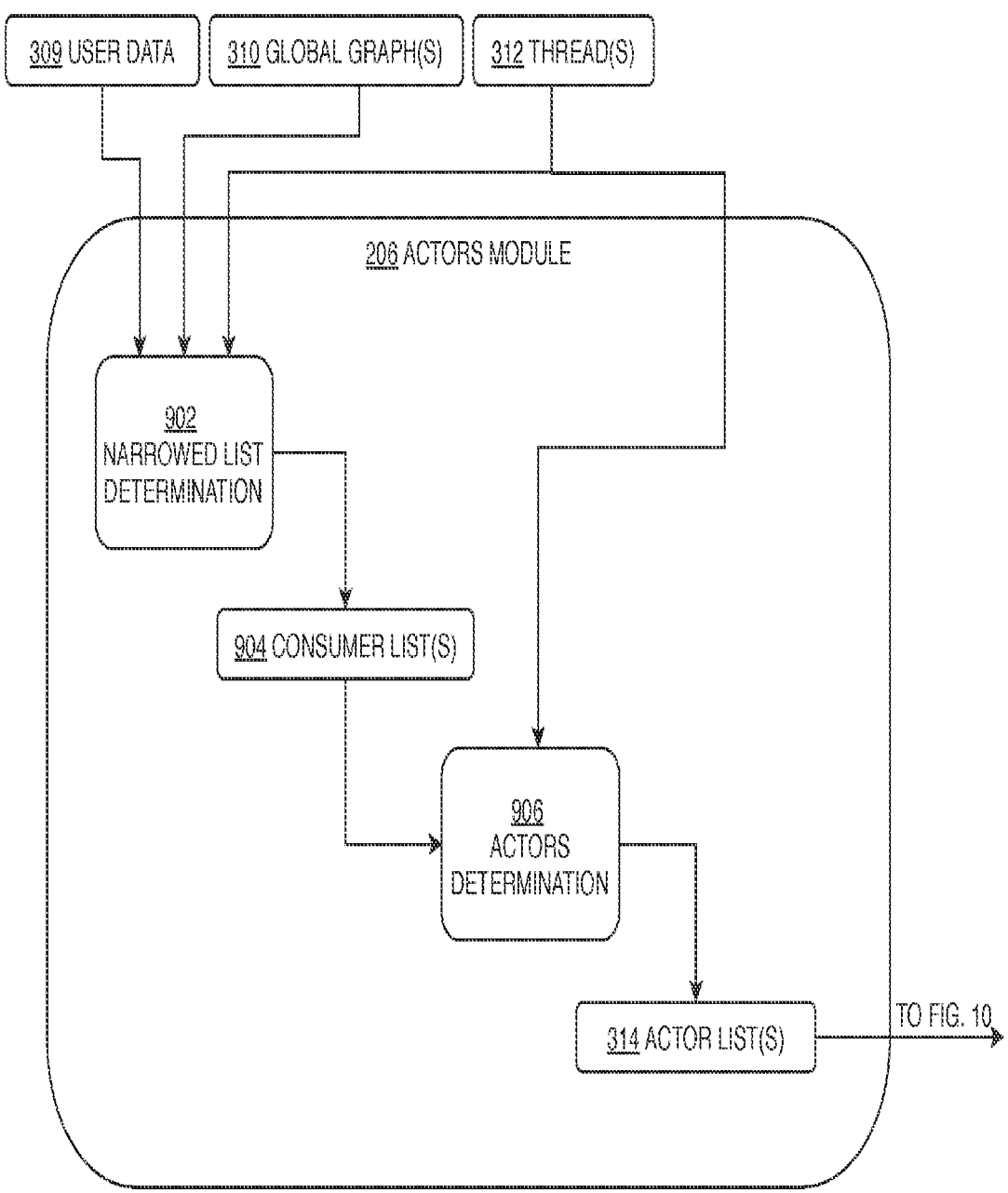
FIG. 9 is a block diagram depicting an actors module, in an example embodiment.

FIG. 9 is a block diagram 900 depicting an actors module 206, in an example embodiment. The actors module 206 is configured to determine one or more actor lists 314. In an embodiment, an actor is a dynamic representation of a user. An actor may be a user, such as user 110A, 110B of FIG. 1, a computer, an AI bot, or any other system that consumes the content of the communication in order to act upon it.

In an embodiment, the actors module 206 first uses the global graphs 310, threads 312, and user data 309 to generate a consumer list 904. In an embodiment, the actors module 206 engages in a narrowed list determination 902 model that takes the global graphs 310, threads 312, and user data 309 as input data and narrows the list of potential consumers of the information. For example, while the global graphs 310 and threads 312 may indicate that a thread involves the topic of a mass layoff, in some instances, only certain users should receive or have access to this mass layoff information so as to not cause a company-wide panic. This model identifies the appropriate or targeted consumers of communication data as Persons of Interest (POI) based on an internal weight algorithm. The algorithm takes into account a variety of POI-related features, such as whether the POI is addressed, either directly or indirectly, in a discussion, whether there are any questions or action directives directed at the POI, whether the topics and/or users in a discussion are related to the POI, and so forth. Any number of factors may be used to identify and weigh the POI or consumer and subsequently generate a consumer list 904.

In an embodiment, user data 309 includes data pulled from third party databases, such as customer management tools and their associated database. In some cases, a global graph 310 and thread 312 is limited to company-specific information and lacks information on customers of such a company. For example, if Company A is a service provider for Company B and Company C, the global graphs 310 and threads 312 generated for Company A may be limited to the service provider's users. However, obtaining user data 309 from a third party customer databases, such as a CRM, would allow the actors module 206 to generate a more comprehensive consumer list 904 pertaining to consumers of information from Company B and Company C, in the example above. In the event that customer support personnel from Company A want to monitor communications from Company B and Company C for customer support purposes, the actors module 206 may access user data 309 from these third party databases that have information on Company B and Company C users and communications.

The generated consumer list 904 and the threads 312 are used for actors determination 906, which is a model that generates one or more actor lists 314. In an embodiment, the consumer list 904 may contain information on any user that would benefit from the discussion, regardless of whether the user is a participant in the discussion. In other embodiments, threads 312 are used to determine which users are direct participants in discussions. Cross-referencing and/or combining the consumer list 904 with the participant information from the threads 312 enables the actors determination 906 module to generate the actors list 314.

In some embodiments, the actor list 314 includes actor identifiers, such as users' full names, usernames, handles, email addresses, or some other identifier of the users who consume the information. In other embodiments, the actor list 314 includes MAC addresses, IP addresses, or any other identifier of one or more computers in a system that is configured to process or consume the information. In some embodiments, the actor list 314 includes identifiers for AI bots, personal assistants, IoT devices, and/or any other system that acts upon provided information. The actors module 206 then sends the actor list 314 to the action items module 208 for further processing, as further described herein.

3.3.1 Actor Representation

In an embodiment, since an actor is a dynamic representation of a user, the actors module 206 may be configured with additional machine learning models that use user-specific information to generate an actor representation. In an embodiment, the actor representation may be a digital construct that represents the state and learned knowledge of any given user. In some embodiments, the actor representation is a digital avatar or an AI bot representation of a user.

In some embodiments, the actor representation is built upon a general neural network that is trained using a general knowledge base of all users. The actor representation builds upon the general knowledge base by using user-specific neural networks that are further trained using user-specific data. As a result, the actors module 206 may generate a digital version of a user that dynamically reflects the state and behavior of that user. In an embodiment, behavior is a function that defines the actions that are to be taken in response to communications at a given point in time. Since actor or user behaviors change over time, the actor representation is configured to match message responses against the current recorded behavior of an actor or user.

In an embodiment, the actors module 206 gathers information from a user's digital presence, including chat messages, email correspondences, social media, SMS and MMS text messages, voice or phone recordings, and so forth. This information on the state and behavior of a user is stored as a user-specific knowledge base in a database, such as database 136. In an embodiment, a user-specific neural network is subsequently trained using the information from the user-specific knowledge base. Once the AI model is trained on how a specific user responds, live data, such as real time communications or message are fed into the actor representation model. The output produced by the trained model are actions and/or responses that reflect the actions and/or responses of the user.

In an embodiment, the actor representation may generate responses using any received communications and the model that is trained using the user-specific knowledge base. In some embodiments, responses will be regulated both grammatically and contextually to ensure that the responses from the actor representation match the behavior of the user. For example, if a user consistently uses a specific phrase without proper punctuation in response to specific requests, then the actor representation will similarly use the same phrase without proper punctuation in response to receiving a similar request.

In some embodiments, the actor representation may be trained on the identity of other actors or actor representations to converse with, what content the communications should entail, the time during which communications should be sent and/or received, the relevancy of certain communications, or any other information.

In an embodiment, the actor representation may perform actions on behalf of the user that it represents. For example, the actors module 206 may generate an actor representation to represent John. In an embodiment, the actionable items 316 that are generated by the action items module 208, and which would ordinarily be sent to John, would be sent to John's actor representation instead. In an embodiment, the actor representation updates its state to reflect the new actionable item 316.

Using John's user-specific knowledge base, the actor representation may elect to store the actionable item 316 as a new item, view or unview any associated information on John's behalf, and/or drop the item as irrelevant on John's behalf. In some embodiments, the actor representation may reply to a received messages using the same grammar, syntax, content, and/or context that John would. In an embodiment, the degree to which the actor representation may perform these actions on behalf of a user may be regulated by security permissions. When John performs an action, the actor representation and the associated user's knowledge base are updated. For example, any actions taken by John may be used as user feedback in the feedback module 210, further described herein, to improve the functionality, behavior, and accuracy of the actor representation.

Referencing FIG. 3, in some embodiments, the actors module 206 may generate an actor representation by first receiving information through threads 312, metadata associated with the threads 312, global graphs 310, or any other source. In some embodiments, the actors module 206 may modify a current state of the actor representation that is stored in an associated database, such as database 136, based on the information received. The current state may be a current accumulation of information associate with the user-specific actor representation. In some embodiments, the actors module 206 generates an updated state and stores the updated state in the associated database 136. In some embodiments, the actors module 206 works with the action items module 208 to generate actionable items 316 that may be stored in conjunction with the user-specific actor representation in database 136.

In some embodiments, the actors module 206 may determine an optimal delivery mode, such as various applications or communication streams to deliver the actionable items 316. The actors module 206 may subsequently work with the display module 212 to format and send the actionable items 316 for subsequent display. In an embodiment, the actors module 206 is configured to receive, evaluate, and respond to communication activities using the actor representation. For example, the actor representation forward messages, respond to message, schedule meetings, or engage in any other communication activities on behalf of a user.

3.4 Action Items Module

Figure 10:
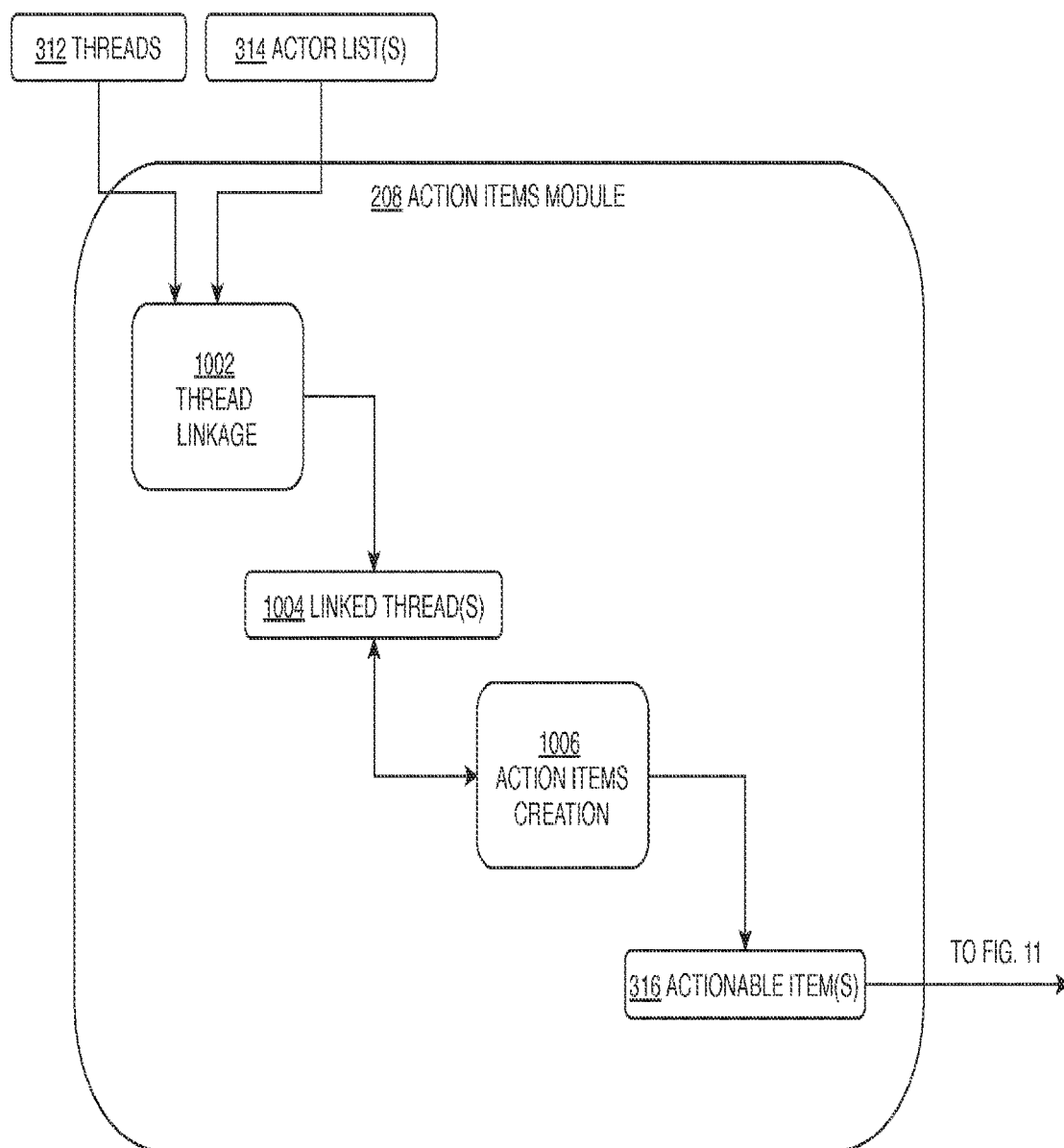
FIG. 10 is a block diagram depicting an action items module, in an example embodiment.

FIG. 10 is a block diagram 1000 depicting an action items module 208, in an example embodiment. The action items module 208 engages in thread linkage 1002 using a model that uses the threads 312 generated by the communication threads module 204 and the actor list 314 generated by actors module 206. In an embodiment, the action items module 208 links threads 312 with selected users to create context-rich threads that are user-specific. Each linked thread 1004 is unique for each selected user. For example, one thread 312 can produce N linked threads 1004, depending on the number of users participating or featured in the thread 312.

Subsequently, the action items module 208 engages in action items creation 1006 using a module that consumes linked threads 1004 and, for each linked thread 1004, produces one or more actionable items 316. In an embodiment, actionable items 316 are user-specific, since they are based on user-specific linked threads 1004. Any given linked thread 1004 may have no actionable items 316 or any number of actionable items 316. For example, the same content may produce a first actionable item 316 to answer an open question for a first user, while the same content may produce a second actionable item 316 to follow up on the question or action directive for a second user, such as a manager. As another example, if sentiment analysis of various threads 312 reveals a drop in sentiment for one user, the action items module 208 may generate an actionable item 316 directed at the user's manager or Human Resources (HR) representative may receive an actionable item 316 to engage with the user. In this embodiment, the action items module 208 may also automatically schedule a meeting to discuss work-life balance, stress management training, or take any other action to address the drop in sentiment.

In an embodiment, actionable items 316 may include open questions addressed to a specific user or a group, an action direct addressed to a specific user or a group, a calendar event invitations and associated times, meeting invitations and associated times, requests, prioritized messages or lists, action items, tasks, to-do lists, check lists, reminders, alerts, notifications, or any other actionable items 316. In some embodiments, the method of delivery of the actionable item 316 is determined based on the type of actionable item and the user or actor of the actor list 314 for whom the actionable item is intended. For example, in some embodiments, the action items module 208 may prioritize received messages into different priority categories. In an embodiment, the priority category determines whether the actionable item 316 will be delivered to the user immediately, at a later time, or upon user request.

In an embodiment, a machine learning classifier may be used to learn user-specific prioritization of certain message based on a variety of different factors. For example, the training data may include organization charts for identifier a user's direct supervisor, a C-level executive, or a fellow department member whose messages may be prioritized higher. The training data may also include the manner in which the message is sent, for example, at-mentions, direct messages, and/or messages from a user's favorite list may be prioritized higher than messages without such characteristics. User feedback data generated by the feedback module 210, as further described herein, may also be used to custom-prioritize messages based on historic user data. For example, the faster a user has historically responded to certain messages from specific users, the higher the prioritization for a message from those specific users. Historical data may also take into account first time direct message, for example, which may be prioritized higher. In another embodiment, groups with historically high user activity or participation may be prioritized over groups with historically less user activity or participation. In yet another embodiment, the historical recency of user activity may be used to prioritize more recent interactions over stale interactions. Any time period (e.g. milliseconds, seconds, minutes, hours, days, weeks, months, etc.) for measuring staleness may be used.

In some embodiments, the trained model categorizes messages into four categories: high priority, medium priority, low priority, and no priority. High priority may correspond to any messages that should be read or addressed immediately. Medium priority may correspond to any messages that should be read or addressed later. Low priority may correspond to any messages that are informational and may not need to be addressed. No priority may correspond to trash or null items. Any number with any level of prioritization may be used. In some embodiments, the prioritized messages may be color-coded to represent the different prioritization categories. In some embodiments, the prioritized messages may be sent to the display module 212 for subsequent visualization and display, as further described herein.

3.5 Display Module

Figure 11:
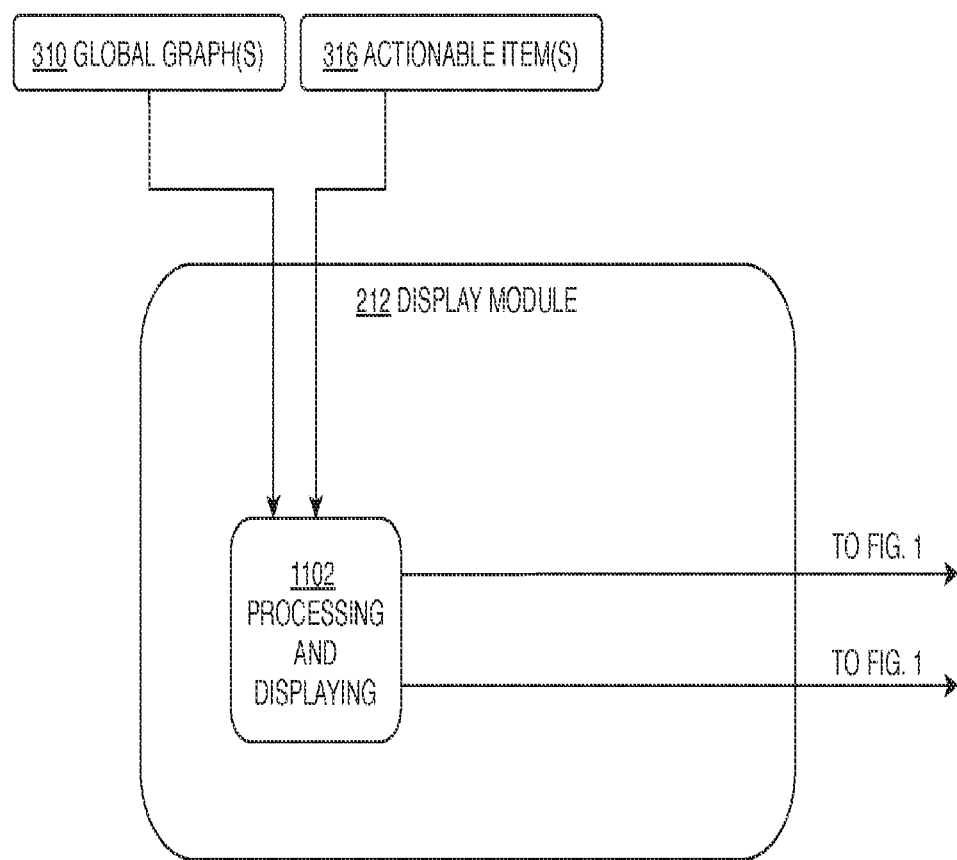
FIG. 11 is a block diagram depicting a display module, in an example embodiment.

FIG. 11 is a block diagram 1100 depicting a display module 212, in an example embodiment. The display modules 212 is configured with a set of instructions for processing and displaying 1102. For example, in some embodiments, the display module 212 may receive the generated global graphs 310, actionable items 316, or any other information generated. Display module 212 processes or formats the global graphs 310 and/or actionable items 316 in accordance with user preference. For example, some users may want the information in a PDF, GIF, or some other file format. In another embodiment, the actionable items 316 and/or global graphs 310 may be formatted for mobile devices. Any processing or formatting may be used.

In an embodiment, the display module 212 is configured to process and format for display any information processed by the system 300 of FIG. 3. For example, in addition to global graphs 310 and actionable items 316, the display module 212 can process and format for subsequent displaying, for example, statements 306, acts 308, grouped statements 604, metadata extracted during the metadata extraction 608, participant data 704, named entity data 706, conceptual type data 708, threads 312, consumer lists 904, actor lists 314, linked threads 1004, questions 1204 for user responses, or any other information. In some embodiments, the system 300 uses any of the above information to derive additional information on user performance. This additional information on user performance may include for example: engagement, focus, responsiveness, sentiment, social graphs, scores for any of the former, or any other insights into users, any of which may be formatted and displayed by the display module 212.

In some embodiments, the display module 212 is configured to receive requests from a client device, such as client devices 112A, 112B of FIG. 1. Upon receiving the request, the display module 212 processes and sends the global graphs 310, actionable items 316, and/or any other requested information to the client devices 112A, 112B for subsequent display. In other embodiments, the display module 212 is configured to process and send the global graphs 310 and/or actionable items 316 to the client devices 112A, 112B at a preset time, on a set schedule (i.e. at specific time intervals), on a time delay (e.g. 1 hour from now), or in accordance with any other customizable configurations.

3.6 Feedback Module

Figure 12:
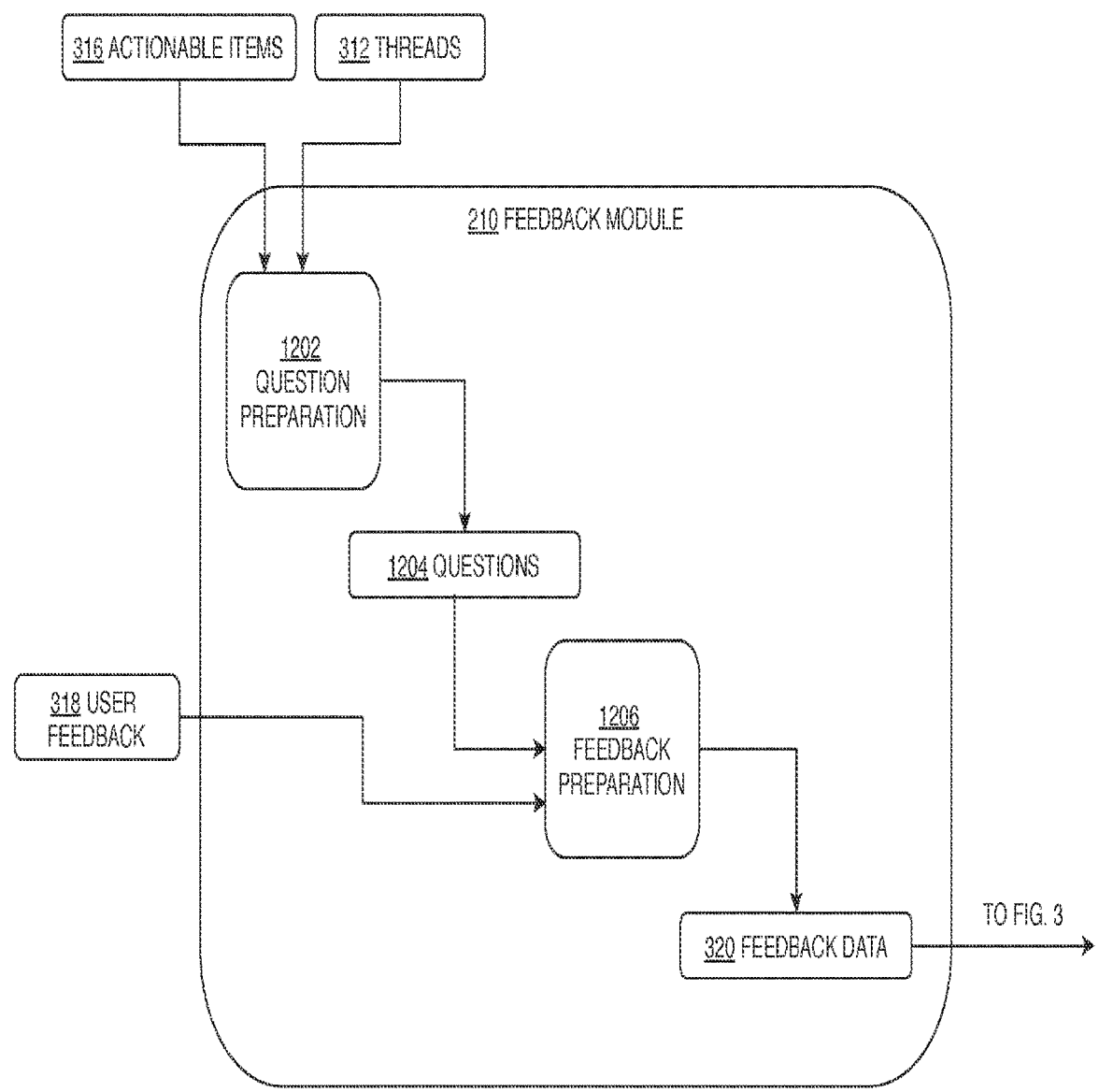
FIG. 12 is a block diagram depicting a feedback module, in an example embodiment.

FIG. 12 is a block diagram 1200 depicting a feedback module 210, in an example embodiment. The feedback module 210 is relied upon by the AI-based models and machine learning techniques described herein. Any user feedback 318 may be used as additional training data for each of the models such that the models can learn over time. User feedback 318 may be direct or indirect, as further described herein.

In an embodiment, the feedback module 210 receives threads 312 from the communication threads module 204 and actionable items 316 from the action items module 208. In some embodiments, to obtain direct user feedback 318, the feedback module 210 initiates question preparation 1202. In an embodiment, question preparation 1202 is a model that generates one or more questions 1204 or requests for feedback that are directed at users, such as users 110A, 110B of FIG. 1. In some embodiments, questions 1204 may be in the form of pop-up notifications with multiple choice requests, rating requests, classification requests, or any other types of requests that are configured to receive user input. In an embodiment, the feedback module 210 receives direct user feedback 318 for subsequent use in supervised or unsupervised machine learning. A user's direct expression of preferences, such as up voting or down voting particular messages, events, participants, or topics, confirming information that is provided in notifications, or any other expressions of user preference may be used as direct user feedback 318.

While in some embodiments, direct user feedback 318 is received in response to sending questions 1204 that prompt users to respond, in other embodiments, the feedback module 210 is automatically configured to monitor and receive any and all user activity as indirect user feedback 318 on an on-going basis. For example, the feedback module 310 may automatically track any given user's communications behavior in real-time to obtain information on messaging patterns, preferences for messaging mediums such as email or chat, the identity of recipients, response times, attachments, or any other data related to user communications. User feedback 318 may include any user action or choice, such as reading messages, ignoring messages, attending or ignoring events, opening links to documents, favoriting communications or users, and/or any other activities that the feedback module 210 may extrapolate information from. In another embodiment, the feedback module 310 may automatically track user adjustments, changes, or corrections of any information provided to the users via the global graph 310, actionable item 316, or any other data provided to the users.

The feedback module 210 then initiates feedback preparation 1206 using the questions 1204 and/or the direct or indirect user feedback 318, which is generated in response to those questions 1204 and/or collected on an on-going basis. The feedback preparation 1206 model is configured to convert user feedback 318 into feedback data 320, which is configured as training data for use by any of the machine learning models described herein. For example, a user's feedback confirming that a message from the user's supervisor was correctly prioritized as "high priority" may be fed back into the machine learning model as training data with the known inputs being such as the supervisor, and known outputs, such as the high priority label. This training data will reinforce the AI model's categorization of messages from the supervisor as "high priority." Similarly, a user's feedback indicating that a message was incorrectly prioritized may be fed back into the machine learning model as training data with In some embodiments, the feedback data 320 is used by the statements module 202 of FIG. 3 and FIG. 4 as training data to further train or refine its statement partitioning 402 and/or its deep neural network 412 and improve its generation of statements 306 and/or acts 308. The feedback data 320 is also used by the communication threads module 204 of FIG. 3, FIG. 5, FIG. 6, and FIG. 7 as training data to further train or refine its statements grouping 602 and/or extraction of participant data 704, named entities data 706, and conceptual type data 708 during thread creation 606. Consequently, improved statements, improved acts, improved threads, improved actor lists, and improved actionable items maybe be generated due to the refined machine learning model(s). In some embodiments, completely new actionable items may be identified using the these refined machine learning models and subsequently generated for subsequently display.

In an embodiment, feedback data 320 is stored in relation to user-specific knowledge bases and used as training data to refine actor representation. In some embodiments, the way actor representations interact with different users or other actor representation may be used propagate learning. As a result, data structures become ever-evolving, as other aspects of the overall system, such as the global graph 310, learn over time. In some embodiments, the feedback module 210 may also receive training data that is external to and outside of current user communications. For example, existing historical data stored in third party databases or public knowledge databases, such as database 136 of FIG. 3.

4.0 PROCEDURAL OVERVIEW

Figure 13:
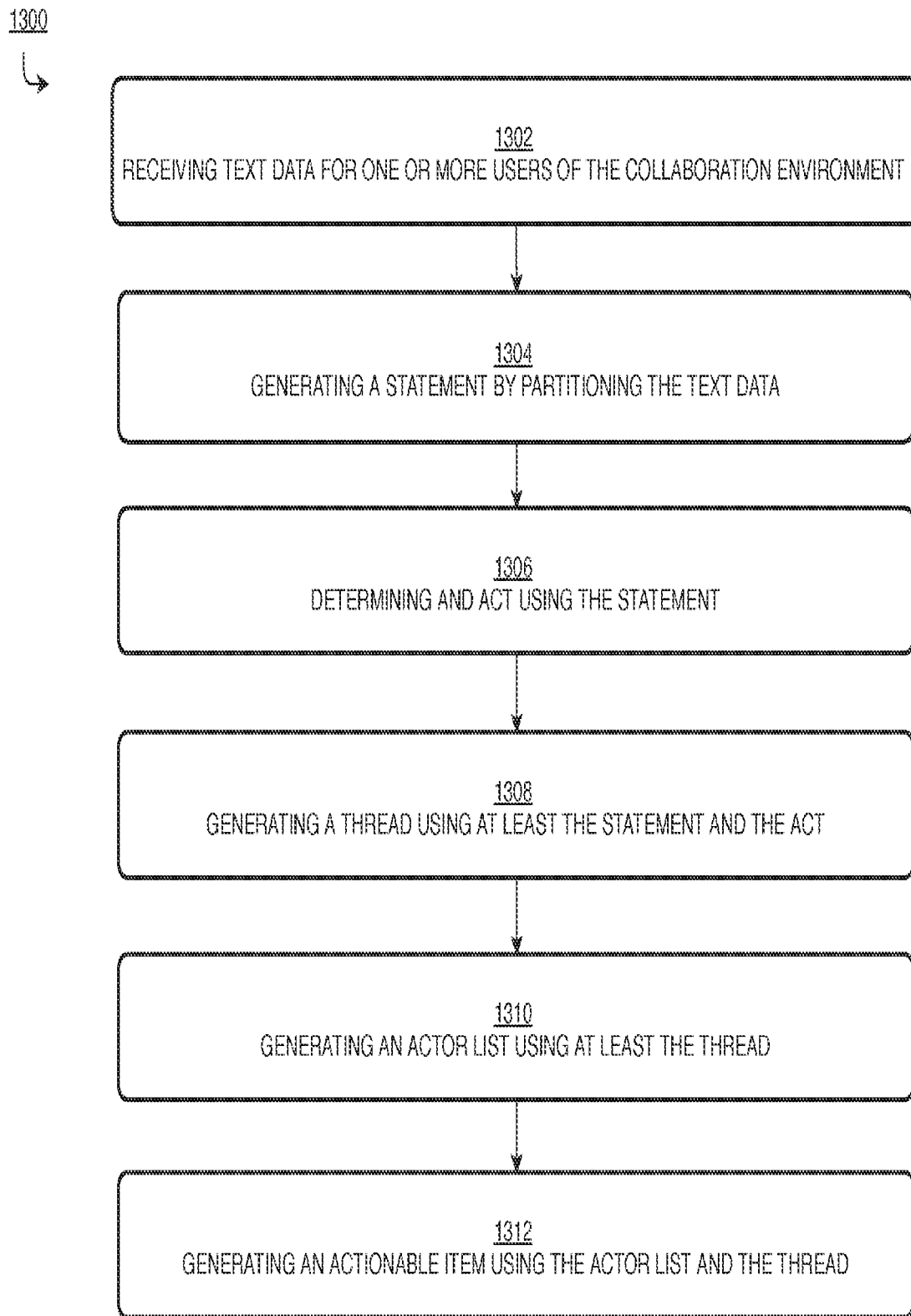
FIG. 13 is a flowchart depicting a machine learning process for structuring information in a collaboration environment, in an example embodiment.

FIG. 13 is a flowchart depicting a machine learning process 1300 for structuring information in a collaboration environment.

At step 1302, text data for one or more users of a collaboration environment is received. For example, the system 300 may receive the text data 304 of FIG. 3 and FIG. 4. In some embodiments, the security data 302 associated with the text data 304 is also received. In an embodiment, the security data 302 and text data 304 is obtained from database 136 and/or from on-going communications.

At step 1304, a statement is generated by partitioning the text data. In an embodiment, the text data, which may contain various segments are partitioned or split into their respective segments using NLP. Each segment inherits the security settings applied to the original text data.

At step 1306, an act is determined using the statement. In an embodiment, determining the act involves extracting features data and semantic vector data from the statement using a neural network, such as Word2vec or any other relevant neural network, and feeding the features data and the semantic vector data through a trained deep neural network, such as a CNN, to determine the act.

At step 1308, a thread is generated using at least the statement and the act. In some embodiments, the thread is generated using the statement, the act, and/or user data stored in a database. In some embodiments, the statements are grouped using a machine learning algorithm that further trained using feedback data in order to generate grouped statements. In an embodiment, participant data, named entity data, and/or conceptual type data are extracted from the grouped statements, using a machine learning algorithm that takes in user data and/or feedback data. The thread is subsequently generated using the participant data, named entity data, and/or conceptual type data. In some embodiments, the outliers from the named entity data are removed prior to use in generating the thread. In some embodiments, a global graph is generated using the thread and additional metadata.

At step 1310, an actor list is generated using at least the thread. In an embodiment, the actor list is generated by first using the thread, global graph, and/or user data in order to determine a narrowed list of consumers of the information. In an embodiment, the consumer list and the thread is used to generate an actor list featuring targeted users who act upon the information.

At step 1312, an actionable item is generated using the actor list and the thread. In an embodiment the thread is linked using an actor from the actor list to generate a linked thread. In an embodiment, generating the actionable item comprises generating using the linked thread.

In some embodiments, in response to receiving a display request, the global graph, the actionable item, or any other information generated in the steps of FIG. 13 are processed, formatted, and sent to client devices for subsequent display. In other embodiments, the actionable item or any other information generated are proactively processed, formatted, and sent to client device for subsequent display without the need to receive a display request.

One or more of the machine learning steps of FIG. 13 may be further enhanced using user feedback. In an embodiment, user feedback may be acquired by passively monitoring all user activity and/or actively requesting user feedback. The user feedback is subsequently used by one or more of the AI-models throughout the system of FIG. 3 to learn and adapt to user preferences.

FIG. 14 is a flowchart depicting a feedback process 1400 for the machine learning process 1300 of FIG. 13. The one or more machine learning algorithms or models are further trained using user feedback in either structured or unstructured learning. Live communications data is subsequently fed into the retrained model to generate updated, improved, or more accurate outputs, as further described herein. For example, user feedback may be converted into feedback data that is used as training data for machine learning models used in the statements module 202 and/or the communication threads module 204 of FIG. 3.

At step 1402, user feedback is received from one or more users of the collaboration system. The user feedback may be any feedback related to user activity, such as up votes or down votes, read messages, response times, favorited users, or any other types of user activity that serves as training data for structured or unstructured learning.

At step 1404, a machine learning model is trained or retrained using the user feedback to generate a retrained machine learning model. The retrained machine learning model may be one or more models used in the machine learning process 1300 of FIG. 13.

At step 1406, an improved statement is generated using retrained machine learning model. For example, user feedback may improve the retrained machine learning model's ability to correctly split statements into their respective segments, taking into account punctuation, no punctuation, incorrect punctuation, and so forth.

At step 1408, an improved act is determined using the improved statement. For example, user feedback indicating that a directive was mislabeled as a question, enables the retrained machine learning model to adjust its calculations in determining the correct output as a directive. Consequently, the user feedback may improve the retrained model's ability to correctly identify that certain improved statements correspond to certain improved acts.

At step 1410, an improved thread is generated using at least the improved statement and the improved act. For example, once the retrained model is able to more accurately split statements and identify corresponding acts, the improved statements and improved acts are further used to more accurately generate relevant threads, thereby enabling the model to generate an improved thread.

At step 1412, an improved actor list is generated using at least the improved thread. For example, once an improved thread is generated, the model is capable of more accurately identifying relevant actors to act upon the thread, thereby generating an improved actor list.

At step 1414, an improved actionable item is generated using the improved actor list and the improved thread. For example, once improved actor lists and improved threads are generated, the actionable item that is determine using that improved information is generated. In an embodiment, the improved actionable item more accurately reflects necessary items to take action on. In some embodiments, new actionable items are generated using the improved actor list and improved thread. For example, any direct or indirect user feedback received may be used to automatically determine completely different actionable items that would otherwise be generated.

5.0 EXAMPLE EMBODIMENTS

The systems and methods disclosed herein have multiple practical applications, as further described in example embodiments herein. The system(s) described in reference to FIG. 1, FIG. 2, FIG. 3, FIG. 4, FIG. 5, FIG. 6, FIG. 7, FIG. 8A, FIG. 8B, FIG. 8C, FIG. 9, FIG. 10, FIG. 11, FIG. 12, FIG. 13, and FIG. 14 are collectively referred to as "the system 300" for the purposes of the following example embodiments. Various component of the system 300 that are further described herein in reference to FIG. 1-FIG. 14 are also references herein.

5.1 Intelligent Prioritization of Communication Messaging and Smart Alert

In an example embodiment, John is a company employee. John would normally use a variety of communication systems, such as email readers, instant messaging systems, and collaboration systems. Each of these separate communication systems are independent from one another and require John to sign up for separate notifications. John would use various client devices with various access, such as mobile device applications and/or WebRTC. As a result, John would spend a significant portion of his day staying abreast of all these various forms of communication through all these various systems. John would also be overwhelmed with notifications for instant messages with not method of prioritizing these messages.

With the implementation of the system 300 of the present disclosure, John would access the system 300 using any one of the available user interfaces (UI) (e.g. mobile, personal computer, web, voice communications, smart devices, etc.). John enters his security access credentials for validation. The system 300 organizes John's communications by priority and/or assembled topics, such as specific tags or keywords. In an embodiment, the organization is based on John's selected user preference and/or learned through the systems 300 machine learning techniques.

In this embodiment, the system 300 prioritizes important messages first. In some embodiments, any messages with low or no priority may be hidden, according to John's explicit or learned preferences. For example, statements with act types such as "thank you," "you're welcome," and "goodbye" may be hidden based on John's preferences. Alternatively, the system 300 may cause those messages to be displayed so he can monitor the emotional content of these communications.

In an embodiment, the system 300 organizes John's communications in integrated communication threads. Communications from the different systems, such as email, instant messages, collaboration, and so forth may be collated under a single topic, as determined by the system 300, according to John explicit or learned preferences. In this embodiment, a topic is a set of filters that take into account extracted tags, keywords, groups, participants, or any other metadata. For example, John is a member of two instant message groups: "Sales Team Customer A" and "Support Team Customer A." In addition, John's email features a number of message regarding "Customer A." The system 300 collates statement-act pairs related to "Customer A"

under the topic "Customer A" and causes this collated information to be displayed at John's preferred device.

In an embodiment, the system 300 may prioritize and collate communications of certain act 308 types together. For example, the system 300 may organize all questions directed at him into a list and prioritize each question by importance according to John's explicit or learned preferences. In an embodiment, the system 300 may also enable filtering of these prioritized questions using other features. For example, John may elect to see only unanswered questions or accepted-but-not-completed action directives. In some embodiments, John can answer communications from a single UI or dashboard without the need to look for messages in different messaging groups or across different communication systems.

In an embodiment, the system 300 may access John's knowledge base on a specific topic, such as a list of frequently asked questions across all collaboration systems and chat groups. The system 300 may suggest relevant documents, text, excerpts, answers, and other retained parts of communication based on John's current activity. For example, as John types an answer to a question, he may be altered to the similar answers already provided by his coworkers in relation to the same topic or question, or he may be alerted to a document that was posted in a messaging group with tags that are similar to what he is currently typing.

In an embodiment, based on security permissions, John may drill into communications of other users and groups. For example, the system 300 can provide John with the questions, directives, or any other act 308 type associated with statements 306, that caused the most discussion and/or controversy. The system 300 may also provide John will information on the most repeated question by a specific topic, department, community, and so forth. The system 300 may also generate summaries of discussions. This enables John to create enterprise knowledge systems, provide ad-hoc corporate wiki systems and make adjustments to company workflow for a more optimal sharing of internal knowledge.

The system 300 may monitor John's interactions and proactively notify him to certain events, based on learned patterns, such as accepted action directives that are stale, action directives that are past due or have not been acted upon for a certain period of time, and so forth. The learned patterns can be combined with John's explicit or learned preference and/or enterprise-wide settings.

In an embodiment, John's actions and choices are used as user feedback data 320 in the machine learning system 300. Actions and choices may include reading certain messages, ignoring messages and events, opening links to documents, and other interactions with the information, as well as John's direct expression of preferences (e.g. up voting or down voting particular messages, events, participants, topics, etc.) via visual UI, verbal commands, or otherwise. The system 300 uses the feedback data 320 to train itself and adapt to John's preferences. For example, the system 300 may raise the importance or priority of certain communication messages and lower others to alert John to some events but not others.

In some embodiments, the system 300 adapts to John's schedule and activity preferences. For example, the system 300 may alert him to some messages during work hours, but not during after-work hours, unless the system 300 determines that such messages are of critical importance or as instructed by John. For example, while driving home from work, John may instruct the system 300 to alert him to messages from a particular participant, a group of participants, a topic, or any other types of messages.

As another example, Sally is a company employee. The system 300 may identify Sally's security context for incoming actionable times and determines the scope of the information available to Sally. Security data 302 represent Sally's various user access roles and permissions for enterprise LDAP and in various communication systems. In an embodiment, the security data 302 may be obtained from various company and third party databases 136. Any actionable items 316 generated based on her communications will be limited to the content of her direct communications, private messaging groups, and/or public channels that her roles and permission enable her access to. Just like with John, actionable insights may include dynamic topics with threads 312 ranked and ordered by importance for Sally. Using the system 300 Sally is able to view, at a glance, organized and prioritized information and act on what is most important to her, such as outstanding questions and action directives addressed to her, or follow ups on upcoming deliverables and milestones, all outstanding tasks, and high-priority communications from her supervisors, in accordance with her scope of security access. In an embodiment, the system 300 detects if Sally needs to schedule a follow-up event, such as a meeting or calendaring an event, and either prompt Sally to do so or automatically do so. In some embodiments, the system 300 automatically generates a list of upcoming tasks and events.

In some embodiments, the system 300 is configured to allow Sally to vote up and down certain threads 312, actionable items 316, or any other information generated and displayed. the system 300 may use the up and down votes as feedback data 320 to further train the machine learning system 300 and improve the system's predictive ranking performance. In an embodiment, Sally may up vote or down vote communications from certain users. For example, Sally up votes her supervisor and company executives to stay on top of important communications to and from them. As a result, the system 300 will prioritize these communications and/or specifically notify Sally of messages using an alert bot so that Sally does not miss any important communications. In an embodiment, the system 300 is configured to accept Sally's vote on specific keywords for prioritization and/or notification to better track a specific initiative, project, customer interaction, trend, and so forth.

In an embodiment the system 300 generates a dashboard with featuring updates to events, outstanding tasks, items that need attention or any other item. In some embodiments, the dashboard may be updated by the second, minute, hour, day, week, or any other increment of time. The system's dashboard enables Sally to see important items related to her private and public communications, up or down vote them based on importance and informational content and/or context to improve the system's AI-based predictive ranking performance.

5.2 Topic Briefing and Discovery

In an example embodiment, Sally is a manager working at a company, X-Enterprises. Sally's supervisor asks her to develop a plan for bringing a research project to the market as a product in the shortest amount of time possible in order to respond to a competing company's product.

With the implementation of the system 300 of the present disclosure, Sally would access the system 300 using any one of the available UIs (e.g. mobile, personal computer, web, voice communications, smart devices, etc.). Sally enters her security access credentials for validation. The system 300 enables her access to a Work Analytics Topic Creation screen. The system 300 enables Sally to create a topic with tags or keywords describing the project in question or used during its development, participants, teams, business units, or any other types of contextual data. The system 300 is also configured to generate suggestions of tags, keywords, participants, or any other metadata that is related to her original topic creation. In an embodiment, the system 300 also uses global graphs and graph algorithms to detect the best matches for these suggestions. These system-generated suggestions enable Sally to easily identify and define a topic.

Sally may then navigate to the topic's Workplace Analytics (WPA) dashboard, which features pertinent information for the topic. The WPA dashboard indicates that Team A, Team D, and Team F are actively involved in discussing the topic. The WPA dashboard also indicates that Team D spends significantly more time discussing the topic and is more heavily involved than any other team. Using the WPA dashboard Topics Brief section, Sally may review trending conversations on the subject and check some of the documents and links that have been collected by the system 300 across all communication system and streams that Sally has security access to. The system 300 collates and prioritizes all conversation and documents by order of importance to Sally in relation to the topic. The WPA dashboard also displays key users who participate in communications related to the topic, as well as these key users' roles. In an embodiment, roles may include, for example, knowledge wizard, contributor, influencer, gatekeepers, leaders, disruptors, and so forth.

The system 300 also enables Sally to add the topic to her monitoring list. The system 300 subsequently sends Sally alerts on any issues that are related to the topic and needs attention. In some embodiments, alerts include notifications on important communications, trends, employee performance, customers at risk, sentiment analysis, teams and/or business unit engagement and responsiveness, risk to schedule events, task deliverables, or any other types of notifications.

In an embodiment, Sally provides feedback to the system 300 by voting on incoming notifications and communications. In some embodiments, Sally accesses her topic monitoring dashboard to see items that need attention, related communications, links, and documents. The system also provides topic or project related statistics over time, such as in graphs. In some embodiments, the system 300 also monitors for overall communication health, using performance indicators such as percentage of open questions, rejected and/or pending action directives, focus, sentiment, or any other indicators. For example, Sally may receive an alert that a key user, Jason, who is active on her topic of interest is overloaded. The system 300 reports that Jason's focus is falling, his engagement is growing, and his response time to questions and directives are growing over time. Depending on the security level, the system 300 may enable Sally to check Jason's personal WPA dashboard. In this example, Sally may see that Jason's trending topic includes a second project. The system 300 enables Sally to pull information related to the second project and identify project leaders and/or gatekeepers. Sally is then able to address Jason's workload, allowing him to focus solely on Sally's project.

5.3 Business Unit Work Analytics Dashboard

In an example embodiment, Sally is an engineering manager. Sally has access to the WPA system, which enables her to access her team's public communications flow. In an embodiment, the system 300 will user Sally's security access to determine her level of access. Subsequently, the WPA will display trending topics related to team members for Sally to evaluate. In some embodiments, the system 300 will also display whether the appropriate users within a team are focused on the appropriate projects.

For example, Sally can see that one of her engineering front-end teams is actively discussing the topic of a new initiative using a global graph 310 generated by the system 300. However, the system 300 reveals no communication between the front-end team and the back-end team and/or a relevant project manager (PM). Meanwhile, the system 300 reveals that the back-end team is focused on another initiative and does not contribute to the topic of the new initiative. Based on this information Sally may resolve the lack of communication and align the team accordingly. In an embodiment, Sally's actor representation or avatar that is generated by the system 30 may also resolve the communication issue. For example, she can address the missed communication with the PM and/or assign a different PM to the topic or project. The system 300 will reflect the changes in communication by generating new global graphs 310.

5.4 Employee Review with Social Score

In another example embodiment, Jennifer is a Human Resources (HR) compensation specialist. Her team is preparing for the end of the year bonus and promotion process. Jennifer can use the WPA system to assess employee standing. For example, using her roles and permissions, Jennifer accesses the Employee section of the WPA system. Rather than displaying individual messages, the system aggregates information such as employee engagement, focus, responsiveness, sentiment, and/or social graphs, which the system 300 identifies based on insight from actionable items 316. In an embodiment, each of these employee performance indicators may be scored. These scores may be generated for employees on a team level, department level, company level, or any other level. In an embodiment, the system 300 also generates weekly trends for each performance indicator.

In an embodiment, Jennifer views information pertaining to a specific employee, Sam. Sam's overall engagement is moderate. However, over the last three months, his engagement chart shows a growth and his responsiveness has improved. In an embodiment, the system 300 enables a comparison between Sam's scores and the scores of his team members, which shows that Sam's performance is at the top of his team. In an embodiment, the system 300 also produces sentiment scores, which shows that Sam has a high sentiment score. Based on Sam's performance, Jennifer is able to set Sam's bonus accordingly. In an embodiment, Jennifer's actor representation, which is generated by the system 300, automatically sets Sam's bonus based on the above factors.

In another embodiment, Jennifer views information pertaining to a specific employee, Lynda. Lynda's scores are in the top 3% of her department and top 5% of the company. The system 300 identifies Lynda as an influencer. The system 300 produces Lynda's social graph where Lynda is recognized as a potential leader. Based on this information, Jennifer is able to discuss a promotion path for Lynda with the management team. In some embodiments, Jennifer's actor representation, which is generated by the system 300, automatically determines a promotion path with the actor representations of the management team.

In another embodiment, Jennifer views information pertaining to a specific employee, Jeff. The system 300 shows that Jeff has good engagement, but low sentiment and a broad focus. This information suggests that Jeff is involved in too many different conversations pertaining to unaligned topics. The system 300 also shows that while is responsiveness is reasonable, his score for accepting and completing action directives is low. Jennifer may discuss her findings with Jeff's manager and place him on a performance improvement plan.

In some embodiments, Jennifer delegates the gathering of aggregated information and employee performance statistics analyses to a software program, such as a deep learning system that analyzes employee performance patterns. This program is an example embodiment of a non-human consumer or actor of the system 300.

5.5 Company Policy Compliance Monitoring and Auditing

In an example embodiment, Elena is an employee in the finance department tasked with detecting leaks related to the company's stock. She uses the system 300 to monitor all communication streams, both internal and external, including social media streams for stock-related communications. The system 300 is capable of detecting when sensitive or otherwise private information appears in unauthorized domains. For example, the system 300 may visualize track conversations pertaining to sensitive stock information as it is distributed into a public chat group or forwarded to an external email address. The system alerts Elena about any suspicious information dissemination patterns. The system 300 allows Elena to identify the source using, for example, visual tools and subsequently stop the spread of information. In an embodiment, Elena provides feedback to the system to reduce false positive results. Similar techniques may be used to detect communication threads 312 for compliance with a company's harassment policy, for example.

5.6 Optimization of Cross-Department Communications

In an example embodiment, Sally is an executive vice president. Sally receives the results of an HR survey that reports employee complaints about cross-departmental communication problems. Sally opens an Organizational Workplace Analytics dashboard provided by the system 300, which provides a heatmap and supporting tables of cross-departmental communications. Sally is able to see two potential communication problems. Using the UI, she drills down and sees visualized communication flows. Sally is able to discover the problematic group of users using topics and keywords in order to track information loss. Sally drills down into specific users, aggregates a list of problematic users, and a list of cross-departmental communication activities. Subsequently, Sally is able to develop a plan to promote and improve communications. In some embodiments, Sally is proactively alerted when communications slow down or if it does not meet a set standard.

What is claimed is:

1. A computer-implemented machine learning method for improving a collaboration environment, the method comprising:
   receiving text data for one or more users of the collaboration environment;
   generating a statement by partitioning the text data;
   determining an act using the statement using a trained machine learning model;
   receiving user feedback from the one or more users;
   training the machine learning model using the user feedback to generate a retrained machine learning model;
   generating an improved statement using the retrained machine learning model; and
   determining an improved act using the retrained machine learning model.

2. The computer-implemented method of claim 1, wherein determining the act comprises extracting feature data and semantic vector data from the statement, and processing the feature data and the semantic vector data using the trained machine learning model.

3. The computer-implemented method of claim 2, wherein extracting feature data and semantic vector data from the statement further comprises:
   extracting the feature data and the semantic vector data from the statement using the trained machine learning model.

4. The computer-implemented method of claim 1, further comprising
   generating a thread using at least the statement and the act; and
   generating an actor list using at least the statement.

5. The computer-implemented method of claim 4, further comprising:
   extracting participant data, named entity data, and conceptual type data from the statement; and
   wherein generating the thread comprises generating using the participant data, the named entity data, and the conceptual type data.

6. The computer-implemented method of claim 4, further comprising linking the thread using an actor from the actor list to generate a linked thread.

7. The computer-implemented method of claim 4, further comprising generating an actionable item using the actor list and the thread.

8. The computer-implemented method of claim 1, wherein the statement is associated with a same security settings as the text data.

9. A machine learning system for improving a collaboration environment, the system comprising:
   a processor;
   a memory operatively connected to the processor and storing instructions that, when executed by the processor, cause:
      receiving text data for one or more users of the collaboration environment;
      generating a statement by partitioning the text data;
      determining an act using the statement using a trained machine learning model;
      receiving user feedback from the one or more users;
      training the machine learning model using the user feedback to generate a retrained machine learning model;
      generating an improved statement using the retrained machine learning model; and
      determining an improved act using the retrained machine learning model.

10. The machine learning system of claim 9, wherein determining the act comprises extracting feature data and semantic vector data from the statement, and processing the feature data and the semantic vector data using the trained machine learning model.

11. The machine learning system of claim 10, wherein extracting feature data and semantic vector data from the statement further comprises:
   extracting the feature data and the semantic vector data from the statement using the trained machine learning model.

12. The machine learning system of claim 9, further comprising
   generating a thread using at least the statement and the act; and
   generating an actor list using at least the statement.

13. The machine learning system of claim 12, further comprising:

extracting participant data, named entity data, and conceptual type data from the statement; and wherein generating the thread comprises generating using the participant data, the named entity data, and the conceptual type data.

14. The machine learning system of claim 12, further comprising linking the thread using an actor from the actor list to generate a linked thread.

15. The machine learning system of claim 12, further comprising generating an actionable item using the actor list and the thread.

16. A non-transitory, computer-readable medium storing instructions that, when executed by a processor, cause:

receiving text data for one or more users of the collaboration environment;

generating a statement by partitioning the text data;

determining an act using the statement using a trained machine learning model;

receiving user feedback from the one or more users;

training the machine learning model using the user feedback to generate a retrained machine learning model;

generating an improved statement using the retrained machine learning model; and determining an improved act using the retrained machine learning model.

17. The non-transitory, computer-readable medium of claim 16, wherein determining the act comprises extracting feature data and semantic vector data from the statement, and processing the feature data and the semantic vector data using the trained machine learning model.

18. The non-transitory, computer-readable medium of claim 16, storing further instructions that, when executed by the processor, cause:

generating a thread using at least the statement and the act; and generating an actor list using at least the statement.

19. The non-transitory, computer-readable medium of claim 18, storing further instructions that, when executed by the processor, causes linking the thread using an actor from the actor list to generate a linked thread.

20. The non-transitory, computer-readable medium of claim 18, storing further instructions that, when executed by the processor, causes generating an actionable item using the actor list and the thread.

* * * * *